US012683391B2

(12) United States Patent
Mitani et al.

(10) Patent No.: US 12,683,391 B2
(45) Date of Patent: Jul. 14, 2026

(54) POWER SUPPLY SYSTEM, MOVING OBJECT INCLUDING POWER SUPPLY SYSTEM, AND CONTROL METHOD OF POWER SUPPLY SYSTEM

(71) Applicant: HONDA MOTOR CO., LTD., Tokyo (JP)

(72) Inventors: Manabu Mitani, Wako (JP); Akinori Kita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 286 days.

(21) Appl. No.: 18/618,006

(22) Filed: Mar. 27, 2024

(65) Prior Publication Data

US 2024/0332961 A1　Oct. 3, 2024

(30) Foreign Application Priority Data

Mar. 31, 2023　(JP) ............................. JP2023-056841

(51) Int. Cl.
　*H02J 1/10*　　(2026.01)
　*H02J 1/08*　　(2026.01)
　*H02J 7/82*　　(2026.01)
(52) U.S. Cl.
　CPC .............. *H02J 1/106* (2020.01); *H02J 1/086* (2020.01); *H02J 7/82* (2026.01)
(58) Field of Classification Search
　CPC .... H02J 1/106; H02J 1/086; H02J 7/82; H02J 3/38; B60R 16/03; B64D 35/021; B64D 2221/00; B64D 27/34; B64D 27/357; B64D 27/33; B64D 27/026; B64D 31/16; B64D 31/18; B64D 33/08
See application file for complete search history.

(56) References Cited

U.S. PATENT DOCUMENTS

| | | | | |
|---|---|---|---|---|
| 2019/0071038 A1* | 3/2019 | Maekawa | ............. | B60R 16/033 |
| 2020/0094758 A1* | 3/2020 | Kawakami | ............. | H02M 1/32 |
| 2022/0204173 A1* | 6/2022 | Barraco | ................. | B64D 47/00 |
| 2023/0104265 A1* | 4/2023 | Morita | .................... | H02J 9/061 |
| | | | | 307/23 |

FOREIGN PATENT DOCUMENTS

JP　　　2022-529997 A　　6/2022

* cited by examiner

*Primary Examiner* — Lincoln D Donovan
*Assistant Examiner* — Alex W Lam
(74) *Attorney, Agent, or Firm* — Rankin, Hill & Clark LLP

(57) ABSTRACT

A power supply system includes: a first power supply circuit for supplying, to a first load device, DC power output from a first power generation device; and a second power supply circuit for supplying, to a second load device, DC power output from a second power generation device. In a case where the electric power output from the second power generation device is supplied to the first load device, the first power supply circuit and the second power supply circuit are connected to each other after the output voltage of the second power generation device is lowered.

7 Claims, 22 Drawing Sheets

POWER SUPPLY SYSTEM, MOVING OBJECT INCLUDING POWER SUPPLY SYSTEM, AND CONTROL METHOD OF POWER SUPPLY SYSTEM

CROSS-REFERENCE TO RELATED APPLICATIONS

This application is based upon and claims the benefit of priority from Japanese Patent Application No. 2023-056841 filed on Mar. 31, 2023, the contents of which are incorporated herein by reference.

BACKGROUND OF THE INVENTION

Field of the Invention

The present invention relates to a power supply system, a moving object including the power supply system, and a control method of the power supply system.

Description of the Related Art

In recent years, research and development have been conducted on electrification technology that contributes to energy efficiency in order to ensure that more people have access to affordable, reliable, sustainable and modern energy.

JP 2022-529997 A discloses an aircraft electrical energy supply network (power supply system).

SUMMARY OF THE INVENTION

In the technology related to the electrification technology, there has been a demand for a more satisfactory power supply system, a moving object including the more satisfactory power supply system, and a more satisfactory control method of the power supply system.

The present invention has the object of solving the aforementioned problem.

According to a first aspect of the present invention, there is provided a power supply system comprising: a first power supply circuit configured to supply, to a first load device, electric power output from a first power generation device, the electric power being direct current electric power; a first power storage device connected to the first power supply circuit in parallel with the first power generation device; a second power supply circuit configured to supply, to a second load device, electric power output from a second power generation device, the electric power being direct current electric power; a second power storage device connected to the second power supply circuit in parallel with the second power generation device; a first connection circuit including a first connection device configured to connect the first power supply circuit and the second power supply circuit to each other; and a control device configured to execute, on the first connection device, first connection control for connecting the first power supply circuit and the second power supply circuit to each other via the first connection circuit, wherein, in a case where the electric power output from the second power generation device is supplied to the first load device, the control device executes, on the second power generation device, first voltage reduction control for approximating an output voltage of the second power generation device to an output voltage of the first power storage device, and thereafter executes the first connection control.

According to a second aspect of the present invention, there is provided a moving object comprising the power supply system according to the first aspect.

According to a third aspect of the present invention, there is provided a control method of a power supply system, the power supply system including: a first power supply circuit configured to supply, to a first load device, electric power output from a first power generation device, the electric power being direct current electric power; a first power storage device connected to the first power supply circuit in parallel with the first power generation device; a second power supply circuit configured to supply, to a second load device, electric power output from a second power generation device, the electric power being direct current electric power; a second power storage device connected to the second power supply circuit in parallel with the second power generation device; and a first connection circuit including a first connection device configured to connect the first power supply circuit and the second power supply circuit to each other, the control method comprising, in a case where the electric power output from the second power generation device is supplied to the first load device: executing, on the second power generation device, first voltage reduction control for approximating an output voltage of the second power generation device to an output voltage of the first power storage device; and thereafter executing, on the first connection device, first connection control for connecting the first power supply circuit and the second power supply circuit to each other via the first connection circuit.

According to the present invention, it is possible to provide a more satisfactory power supply system, a moving object including the more satisfactory power supply system, and a more satisfactory control method of the power supply system. This in turn contributes to energy efficiency.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Power Supply System]

Figure 1:
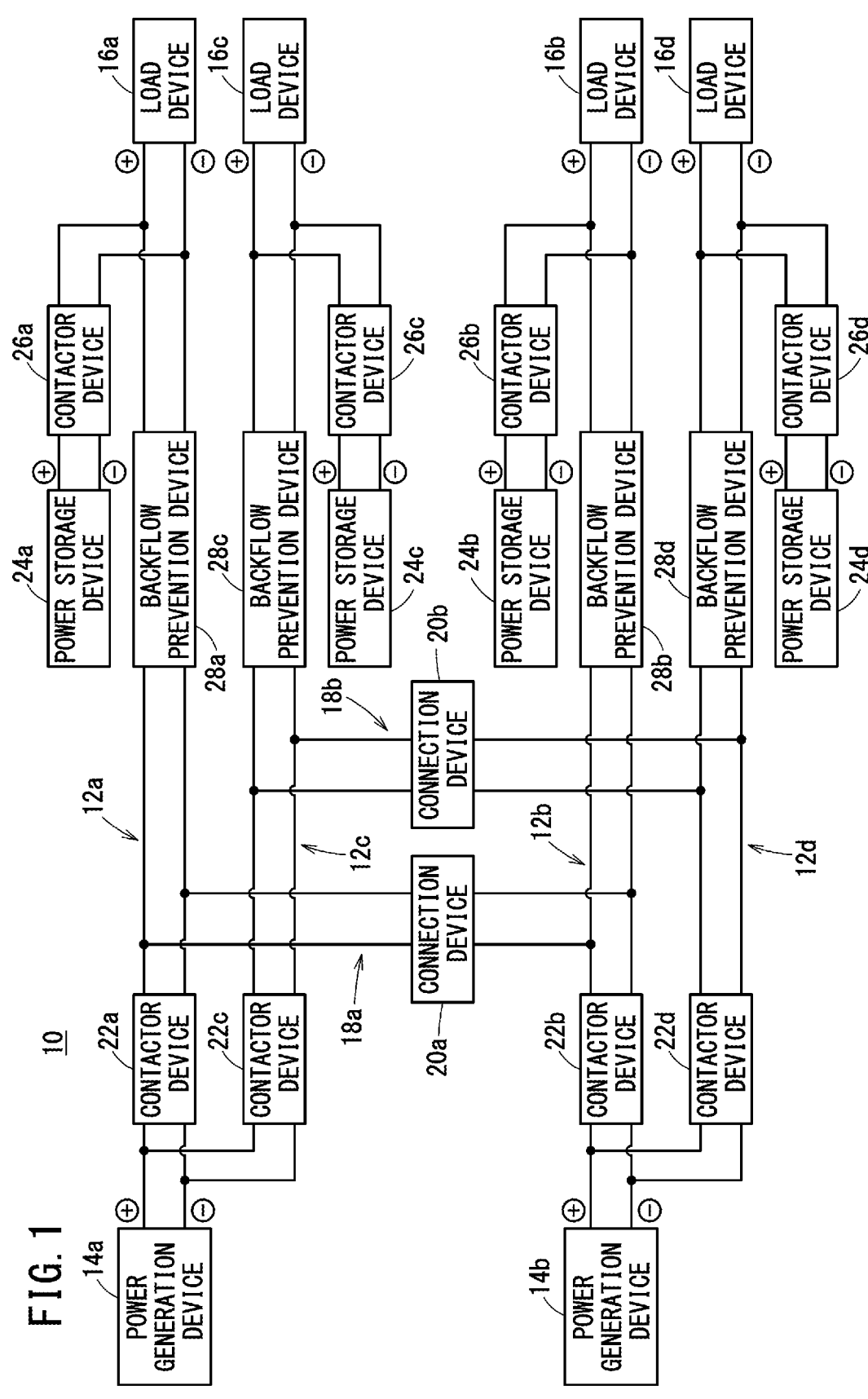
FIG. 1 is a schematic view of a power supply system.

A power supply system of the present embodiment will be described with reference to the drawings. FIG. 1 is a schematic view of a power supply system 10.

The power supply system 10 includes a first power supply circuit 12*a*, a second power supply circuit 12*b*, a third power supply circuit 12*c*, and a fourth power supply circuit 12*d*. The first power supply circuit 12*a* supplies, to a first load device 16*a*, DC power output from a first power generation device 14*a*. The second power supply circuit 12*b* supplies, to a second load device 16*b*, DC power output from a second power generation device 14*b*. The third power supply circuit 12*c* supplies, to a third load device 16*c*, the DC power output from the first power generation device 14*a*. The fourth power supply circuit 12*d* supplies, to a fourth load device 16*d*, the DC power output from the second power generation device 14*b*.

The first power generation device 14*a* and the second power generation device 14*b* each include an engine, a generator, and a power control unit (all of them not shown). The engine drives the generator, and the generator generates three-phase AC power. The power control unit converts the three-phase AC power into DC power.

The first power generation device 14*a* and the second power generation device 14*b* may each include various sensors such as a voltage sensor and a current sensor, and elements such as a fuse, a relay, a breaker, a diode, a transistor, a resistor, a coil, and a capacitor.

The first load device 16*a*, the second load device 16*b*, the third load device 16*c*, and the fourth load device 16*d* each include an inverter and an electric motor (both of them not shown). The inverter converts the input DC power into three-phase AC power, and the electric motor is driven by the three-phase AC power. The first load device 16*a*, the second load device 16*b*, the third load device 16*c*, and the fourth load device 16*d* may each include a DC/DC converter and a low-voltage drive device (both of them not shown). The DC/DC converter lowers the voltage of the input DC power, and the low-voltage drive device is driven by the DC power.

The first load device 16*a*, the second load device 16*b*, the third load device 16*c*, and the fourth load device 16*d* may each include various sensors such as a voltage sensor and a current sensor, and elements such as a fuse, a relay, a breaker, a diode, a transistor, a resistor, a coil, and a capacitor.

The power supply system 10 includes a first connection circuit 18*a* and a second connection circuit 18*b*. The first connection circuit 18*a* includes a first connection device 20*a* capable of connecting the first power supply circuit 12*a* and the second power supply circuit 12*b*. The second connection circuit 18*b* includes a second connection device 20*b* capable of connecting the third power supply circuit 12*c* and the fourth power supply circuit 12*d*.

The first connection device 20*a* and the second connection device 20*b* each include a contactor. The first connection device 20*a* and the second connection device 20*b* may each include a relay. The first connection device 20*a* and the second connection device 20*b* may each include a breaker. The first connection device 20*a* and the second connection device 20*b* may each include a semiconductor switch.

Normally, the connection between the first power supply circuit 12*a* and the second power supply circuit 12*b* is cut off. Thus, when an abnormality occurs in one of the first power supply circuit 12*a* or the second power supply circuit 12*b*, the other can be prevented from being affected by the abnormality. For example, when an overcurrent occurs in one of the first power supply circuit 12*a* or the second power supply circuit 12*b*, the overcurrent is prevented from flowing to the other.

Similarly, the connection between the third power supply circuit 12*c* and the fourth power supply circuit 12*d* is normally cut off. Thus, when an abnormality occurs in one of the third power supply circuit 12*c* or the fourth power supply circuit 12*d*, the other can be prevented from being affected by the abnormality. For example, when an overcurrent occurs in one of the third power supply circuit 12*c* or the fourth power supply circuit 12*d*, the overcurrent is prevented from flowing to the other.

When the supply of electric power from the first power generation device 14*a* to the first power supply circuit 12*a* and the third power supply circuit 12*c* is cut off, the first power supply circuit 12*a* and the second power supply circuit 12*b* are connected by the first connection device 20*a*. Further, the third power supply circuit 12*c* and the fourth power supply circuit 12*d* are connected by the second connection device 20*b*. As a result, electric power is supplied from the second power generation device 14*b* to the first power supply circuit 12*a* and the third power supply circuit 12*c*.

When the supply of electric power from the second power generation device 14*b* to the second power supply circuit 12*b* and the fourth power supply circuit 12*d* is cut off, the first power supply circuit 12*a* and the second power supply circuit 12*b* are connected by the first connection device 20*a*. Further, the third power supply circuit 12*c* and the fourth power supply circuit 12*d* are connected by the second connection device 20*b*. As a result, electric power is supplied from the first power generation device 14*a* to the second power supply circuit 12*b* and the fourth power supply circuit 12*d*.

The power supply system 10 includes contactor devices 22*a* to 22*d*. The contactor device 22*a* can disconnect the first power generation device 14*a* from the first power supply circuit 12*a* and the first connection circuit 18*a*. The contactor device 22*b* can disconnect the second power generation device 14*b* from the second power supply circuit 12*b* and the first connection circuit 18*a*. The contactor device 22*c* can disconnect the first power generation device 14*a* from the third power supply circuit 12*c* and the second connection circuit 18*b*. The contactor device 22*d* can disconnect the second power generation device 14*b* from the fourth power supply circuit 12*d* and the second connection circuit 18*b*.

The contactor devices 22a to 22d each include a contactor. The contactor devices 22a to 22d may each include a relay. The contactor devices 22a to 22d may each include a breaker. The contactor devices 22a to 22d may each include a semiconductor switch.

The power supply system 10 includes a first power storage device 24a, a second power storage device 24b, a third power storage device 24c, and a fourth power storage device 24d. The first power storage device 24a is connected to the first power supply circuit 12a in parallel with the first power generation device 14a. The second power storage device 24b is connected to the second power supply circuit 12b in parallel with the second power generation device 14b. The third power storage device 24c is connected to the third power supply circuit 12c in parallel with the first power generation device 14a. The fourth power storage device 24d is connected to the fourth power supply circuit 12d in parallel with the second power generation device 14b.

The first power storage device 24a, the second power storage device 24b, the third power storage device 24c, and the fourth power storage device 24d each include a lithium ion battery. The first power storage device 24a, the second power storage device 24b, the third power storage device 24c, and the fourth power storage device 24d may each include a secondary battery other than the lithium ion battery. The first power storage device 24a, the second power storage device 24b, the third power storage device 24c, and the fourth power storage device 24d may each include a large-capacity capacitor.

The first power storage device 24a, the second power storage device 24b, the third power storage device 24c, and the fourth power storage device 24d may each include various sensors such as a voltage sensor and a current sensor, and elements such as a fuse, a relay, a breaker, a diode, a transistor, a resistor, a coil, and a capacitor.

The power supply system 10 includes contactor devices 26a to 26d. The contactor device 26a can disconnect the first power storage device 24a from the first power supply circuit 12a and the first load device 16a. The contactor device 26b can disconnect the second power storage device 24b from the second power supply circuit 12b and the second load device 16b. The contactor device 26c can disconnect the third power storage device 24c from the third power supply circuit 12c and the third load device 16c. The contactor device 26d can disconnect the fourth power storage device 24d from the fourth power supply circuit 12d and the fourth load device 16d.

The contactor devices 26a to 26d each include a contactor. The contactor devices 26a to 26d may each include a relay. The contactor devices 26a to 26d may each include a breaker. The contactor devices 26a to 26d may each include a semiconductor switch.

The power supply system 10 includes backflow prevention devices 28a to 28d. The backflow prevention device 28a restricts the supply of electric power from the first power storage device 24a to the first power supply circuit 12a. The backflow prevention device 28b restricts the supply of electric power from the second power storage device 24b to the second power supply circuit 12b. The backflow prevention device 28c restricts the supply of electric power from the third power storage device 24c to the third power supply circuit 12c. The backflow prevention device 28d restricts the supply of electric power from the fourth power storage device 24d to the fourth power supply circuit 12d.

Figure 2:
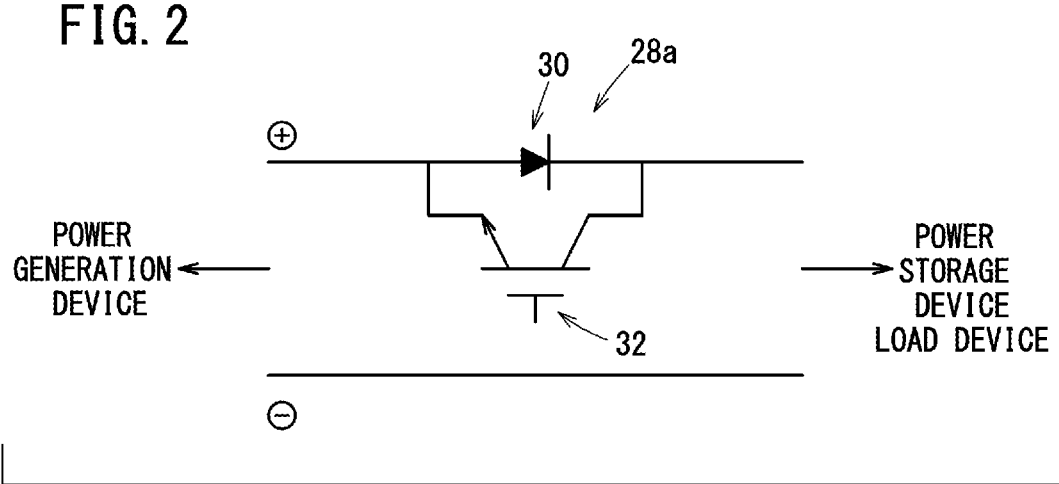
FIG. 2 is a schematic view showing a configuration of a backflow prevention device.

FIG. 2 is a schematic view showing the configuration of the backflow prevention device 28a. The backflow prevention device 28a includes a diode 30 and a transistor 32. The configurations of the backflow prevention devices 28b to 28d are the same as the configuration of the backflow prevention device 28a.

The diode 30 is provided on the positive wire. When the anode voltage is lower than the cathode voltage, the diode 30 allows almost no current to flow. When the anode voltage is higher than the cathode voltage and the potential difference between the cathode and the anode is equal to or higher than a forward voltage, the diode 30 allows a current to flow. As a result, electric power is supplied from the first power supply circuit 12a to the first load device 16a and the first power storage device 24a via the diode 30. On the other hand, electric power is not supplied from the first load device 16a and the first power storage device 24a to the first power supply circuit 12a via the diode 30.

The transistor 32 is provided to bypass the diode 30. When a current flows from the base to the emitter of the transistor 32, a current flows from the collector to the emitter. As a result, electric power is supplied from the first load device 16a and the first power storage device 24a to the first power supply circuit 12a via the transistor 32. In a case where the electric power is not supplied from the first load device 16a and the first power storage device 24a to the first power supply circuit 12a, the transistor 32 may be omitted.

Figure 3:
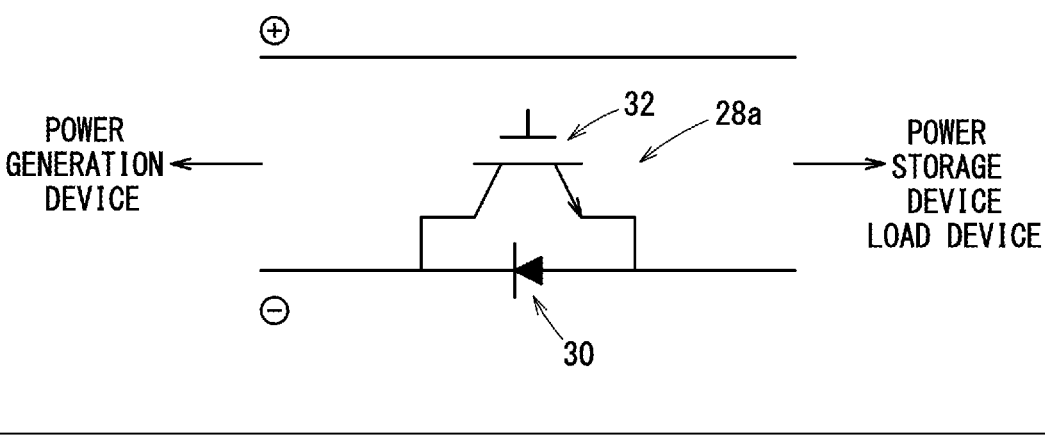
FIG. 3 is a schematic view showing the configuration of the backflow prevention device.

FIG. 3 is a schematic view showing the configuration of the backflow prevention device 28a. As shown in FIG. 3, the diode 30 may be provided on the negative wire. Further, the diodes 30 may be provided on both the positive wire and the negative wire.

The power supply system 10 may include various sensors such as a voltage sensor and a current sensor, and elements such as a fuse, a resistor, a coil, and a capacitor, in addition to the above-described configuration.

[Operation of Power Supply System in Normal State]

Figure 4:
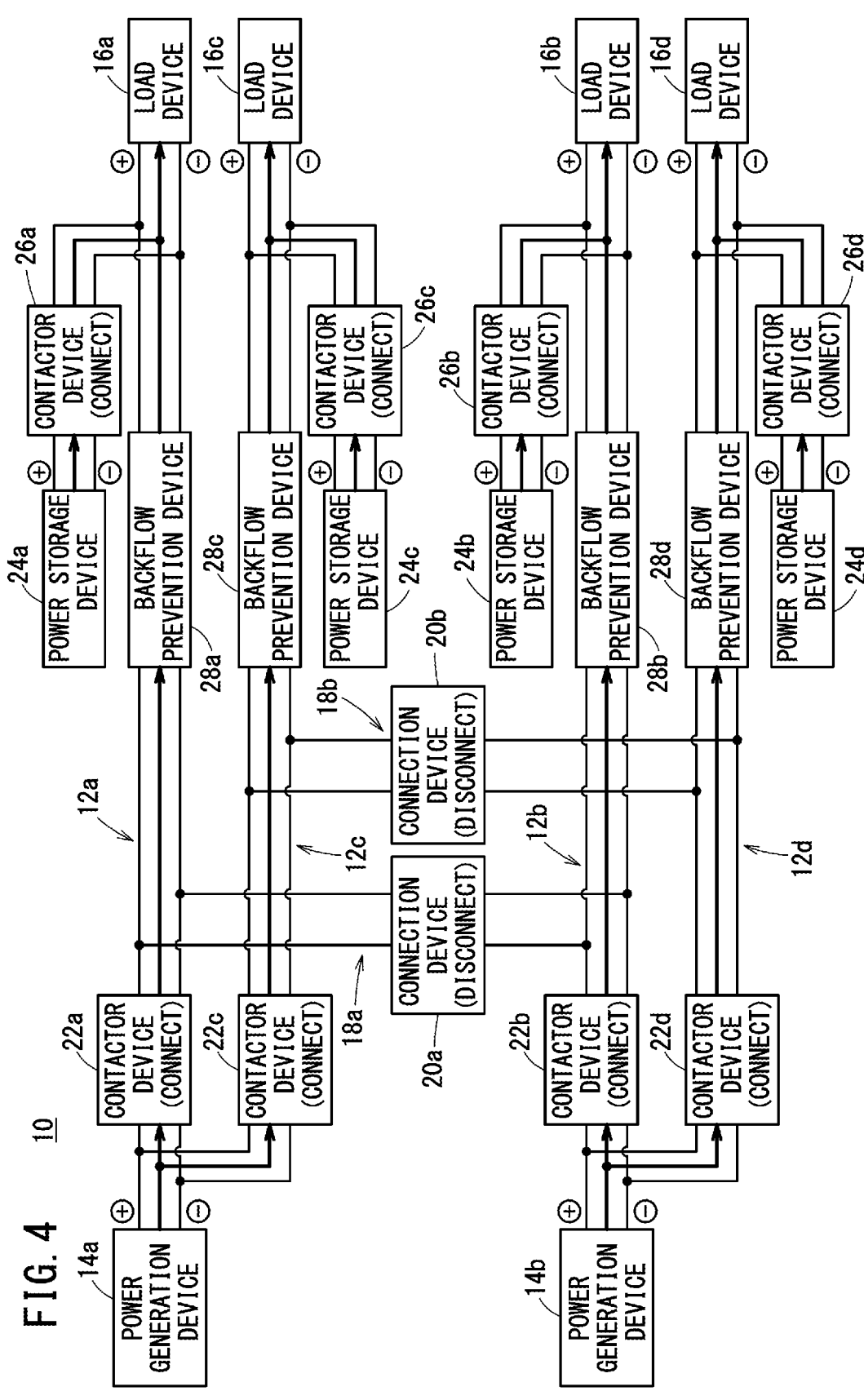
FIG. 4 is a diagram showing the operation of the power supply system in a normal state.

FIG. 4 is a diagram showing the operation of the power supply system 10 in a normal state. Arrows shown in FIG. 4 indicate electric power supply paths.

The first power generation device 14a is connected to the first power supply circuit 12a and the first connection circuit 18a by the contactor device 22a, and the first power generation device 14a is connected to the third power supply circuit 12c and the second connection circuit 18b by the contactor device 22c. As a result, electric power is supplied from the first power generation device 14a to the first load device 16a and the third load device 16c. The second power generation device 14b is connected to the second power supply circuit 12b and the first connection circuit 18a by the contactor device 22b, and the second power generation device 14b is connected to the fourth power supply circuit 12d and the second connection circuit 18b by the contactor device 22d. As a result, electric power is supplied from the second power generation device 14b to the second load device 16b and the fourth load device 16d.

The first power storage device 24a is connected to the first load device 16a by the contactor device 26a, and electric power is supplied from the first power storage device 24a to the first load device 16a. The second power storage device 24b is connected to the second load device 16b by the contactor device 26b, and electric power is supplied from the second power storage device 24b to the second load device 16b. The third power storage device 24c is connected to the third load device 16c by the contactor device 26c, and electric power is supplied from the third power storage device 24c to the third load device 16c. The fourth power storage device 24d is connected to the fourth load device 16d by the contactor device 26*d*, and electric power is supplied from the fourth power storage device 24*d* to the fourth load device 16*d*.

The connection between the first power supply circuit 12*a* and the second power supply circuit 12*b* is interrupted by the first connection device 20*a*, and the connection between the third power supply circuit 12*c* and the fourth power supply circuit 12*d* is interrupted by the second connection device 20*b*.

[Operation of Power Supply System in Event of Abnormality]

FIGS. 5 to 8 are diagrams showing the operation of the power supply system 10 in the event of an abnormality. Arrows shown in FIGS. 5 to 8 indicate electric power supply paths. FIGS. 5 to 8 show the operation of the power supply system 10 in a case where the supply of electric power from the first power generation device 14*a* to the first power supply circuit 12*a* and the third power supply circuit 12*c* is cut off.

The state in which the supply of electric power from the first power generation device 14*a* to the first power supply circuit 12*a* and the third power supply circuit 12*c* is cut off is, for example, a state in which the first power generation device 14*a* is stopped and cannot be restarted, or a state in which a short circuit, disconnection, or the like has occurred between the first power generation device 14*a* and the contactor device 22*a* or between the first power generation device 14*a* and the contactor device 22*c*.

Figure 5:
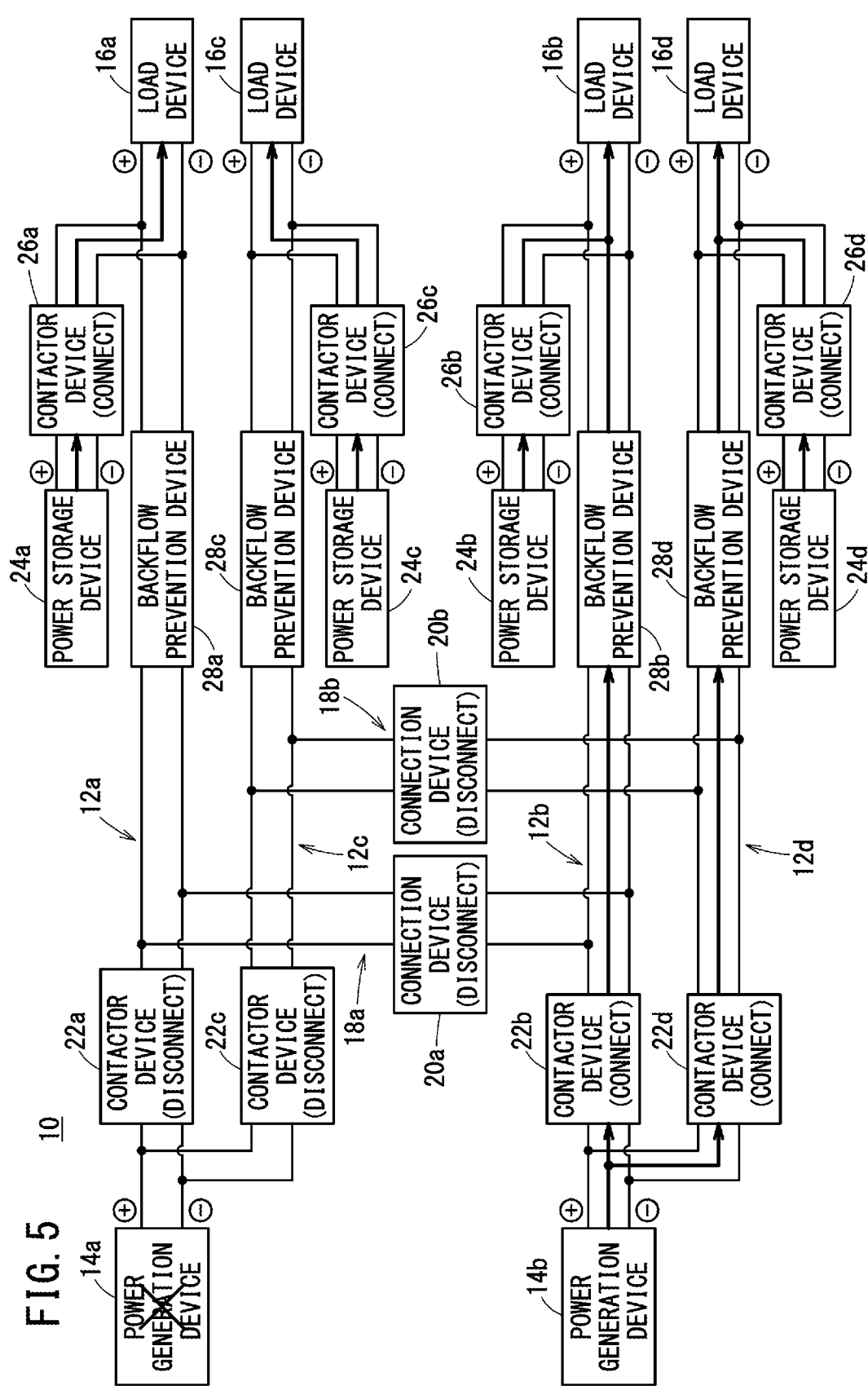
FIG. 5 is a diagram showing the operation of the power supply system in the event of an abnormality.

When the supply of electric power from the first power generation device 14*a* to the first power supply circuit 12*a* and the third power supply circuit 12*c* is cut off, then as shown in FIG. 5, the first power generation device 14*a* is disconnected from the first power supply circuit 12*a* and the first connection circuit 18*a* by the contactor device 22*a*. Further, the first power generation device 14*a* is disconnected from the third power supply circuit 12*c* and the second connection circuit 18*b* by the contactor device 22*c*.

The first load device 16*a* is supplied with electric power only from the first power storage device 24*a*, and the third load device 16*c* is supplied with electric power only from the third power storage device 24*c*. Therefore, the state of charge (SOC) of the first power storage device 24*a* and the SOC of the third power storage device 24*c* decrease. Accordingly, the output voltage of the first power storage device 24*a* and the output voltage of the third power storage device 24*c* decrease. On the other hand, the second load device 16*b* is supplied with electric power from the second power generation device 14*b* and the second power storage device 24*b*, and the fourth load device 16*d* is supplied with electric power from the second power generation device 14*b* and the fourth power storage device 24*d*. Thus, the SOC of the second power storage device 24*b* and the SOC of the fourth power storage device 24*d* hardly decrease. Therefore, the output voltage of the second power storage device 24*b* and the output voltage of the fourth power storage device 24*d* hardly decrease. As a result, the output voltage of the first power storage device 24*a* and the output voltage of the third power storage device 24*c* become lower than the output voltage of the second power storage device 24*b* and the output voltage of the fourth power storage device 24*d*.

When electric power is supplied from the second power generation device 14*b* to the second load device 16*b* and the fourth load device 16*d*, the output voltage of the second power generation device 14*b* is controlled to be higher than the output voltage of the second power storage device 24*b* and the output voltage of the fourth power storage device 24*d*. Therefore, the output voltage of the second power generation device 14*b* is higher than the output voltage of the first power storage device 24*a* and the output voltage of the third power storage device 24*c*.

If the first power supply circuit 12*a* and the second power supply circuit 12*b* are connected to each other in this state, an overcurrent flows through the first load device 16*a* and the first power storage device 24*a*, and the first load device 16*a* and the first power storage device 24*a* may be damaged. Similarly, when the third power supply circuit 12*c* and the fourth power supply circuit 12*d* are connected to each other in this state, an overcurrent flows through the third load device 16*c* and the third power storage device 24*c*, and the third load device 16*c* and the third power storage device 24*c* may be damaged.

In the power supply system 10 of the present embodiment, first voltage reduction control is executed on the second power generation device 14*b*. The first voltage reduction control is control for approximating the output voltage of the second power generation device 14*b* to the output voltage of the first power storage device 24*a* and the output voltage of the third power storage device 24*c*. The first voltage reduction control is executed until a difference between the output voltage of the second power generation device 14*b* and the output voltage of the first power storage device 24*a*, and a difference between the output voltage of the second power generation device 14*b* and the output voltage of the third power storage device 24*c* become equal to or less than a predetermined voltage threshold.

Figure 6:
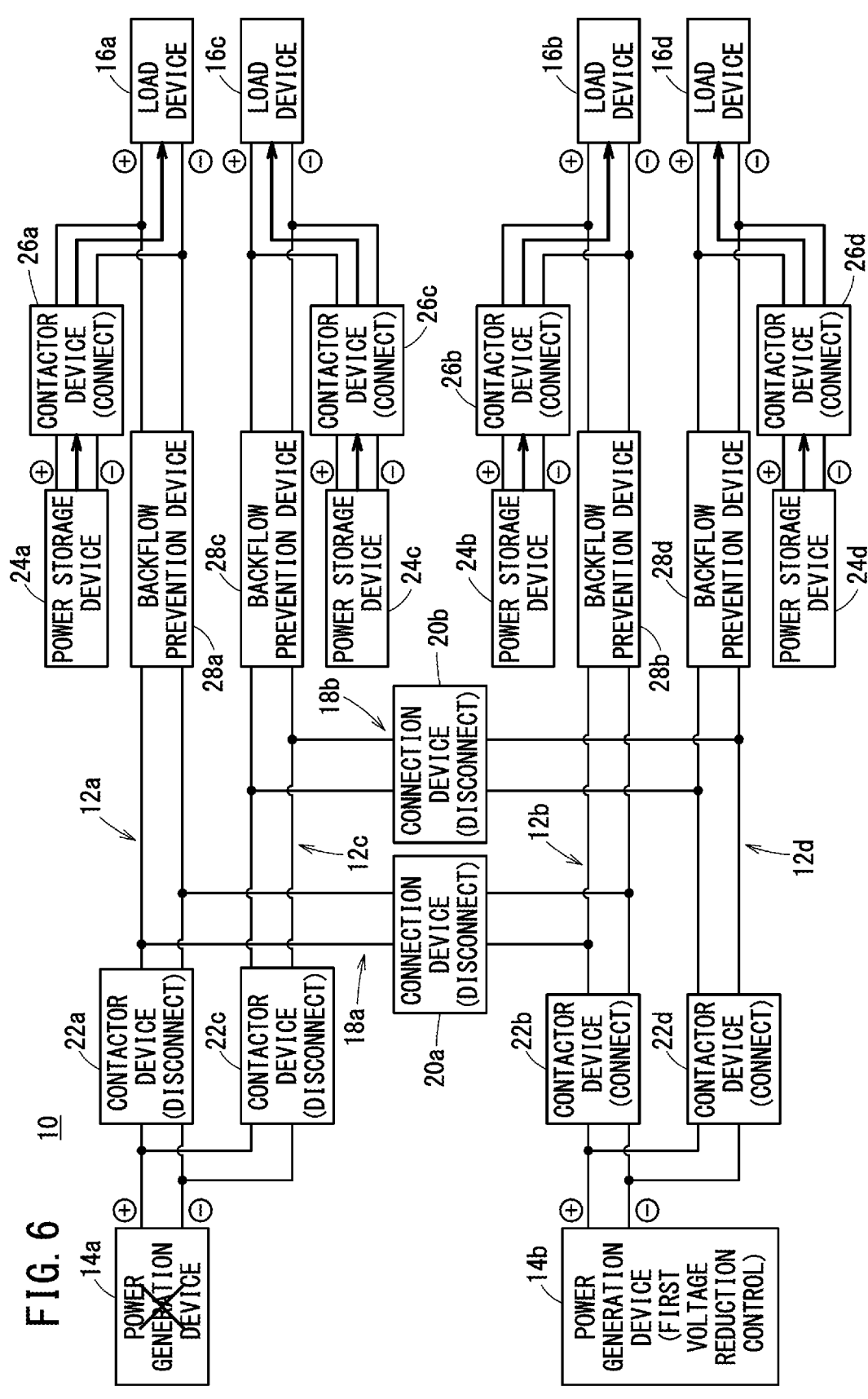
FIG. 6 is a diagram showing the operation of the power supply system in the event of an abnormality.

When the first voltage reduction control is executed on the second power generation device 14*b*, the output voltage of the second power generation device 14*b* becomes lower than the output voltage of the second power storage device 24*b* and the output voltage of the fourth power storage device 24*d*. Therefore, as shown in FIG. 6, the supply of electric power from the second power generation device 14*b* to the second load device 16*b* is restricted by the backflow prevention device 28*b*. Further, the supply of electric power from the second power generation device 14*b* to the fourth load device 16*d* is restricted by the backflow prevention device 28*d*.

Figure 7:
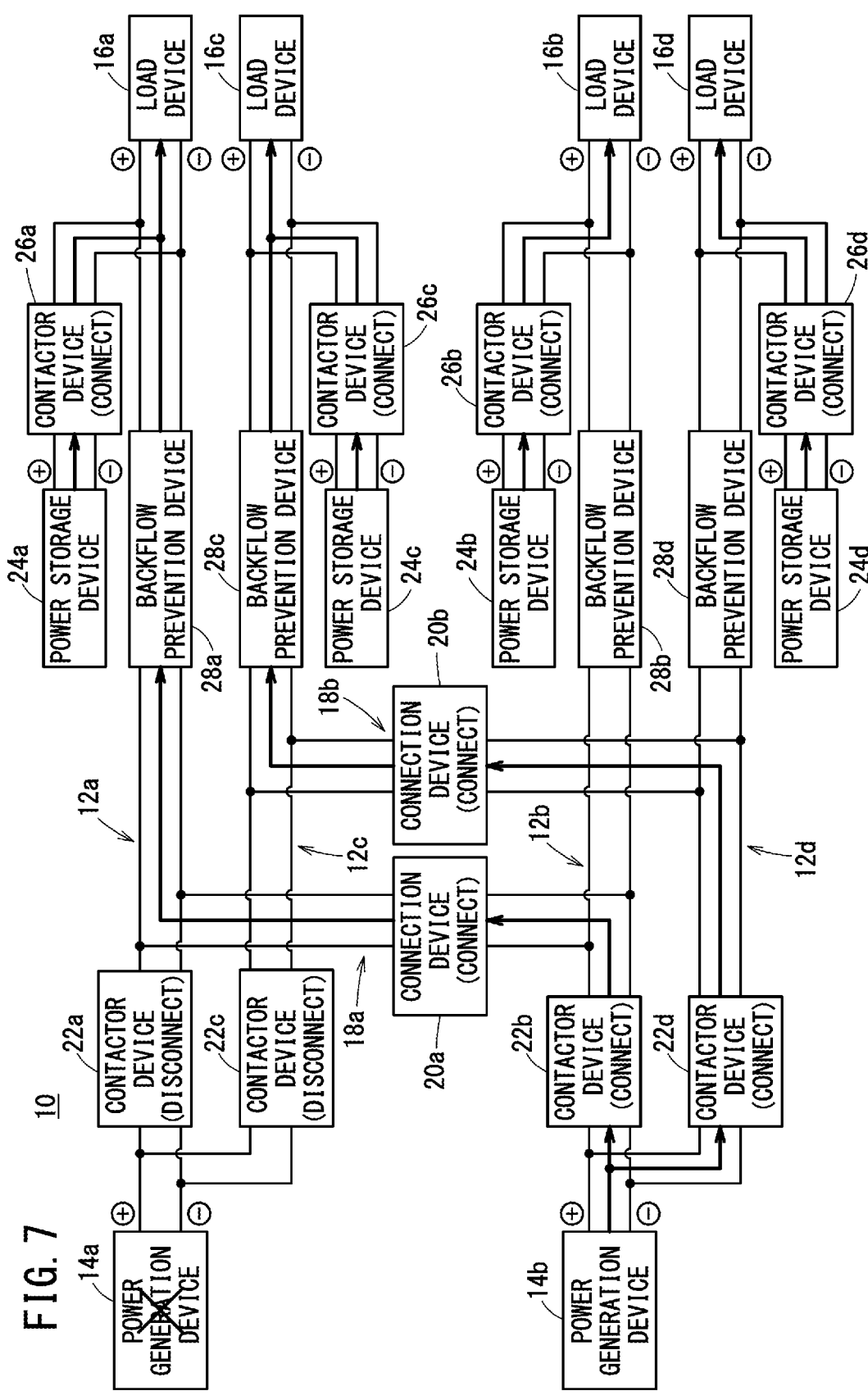
FIG. 7 is a diagram showing the operation of the power supply system in the event of an abnormality.

When the difference between the output voltage of the second power generation device 14*b* and the output voltage of the first power storage device 24*a* becomes equal to or less than the voltage threshold, first connection control is executed on the first connection device 20*a*. When the first connection control is executed on the first connection device 20*a*, then as shown in FIG. 7, the first power supply circuit 12*a* and the second power supply circuit 12*b* are connected to each other via the first connection circuit 18*a*. As a result, electric power is supplied from the second power generation device 14*b* to the first load device 16*a*. Similarly, when the difference between the output voltage of the second power generation device 14*b* and the output voltage of the third power storage device 24*c* becomes equal to or less than the voltage threshold, second connection control is executed on the second connection device 20*b*. When the second connection control is executed on the second connection device 20*b*, then as shown in FIG. 7, the third power supply circuit 12*c* and the fourth power supply circuit 12*d* are connected to each other via the second connection circuit 18*b*. As a result, electric power is supplied from the second power generation device 14*b* to the third load device 16*c*.

Figure 8:
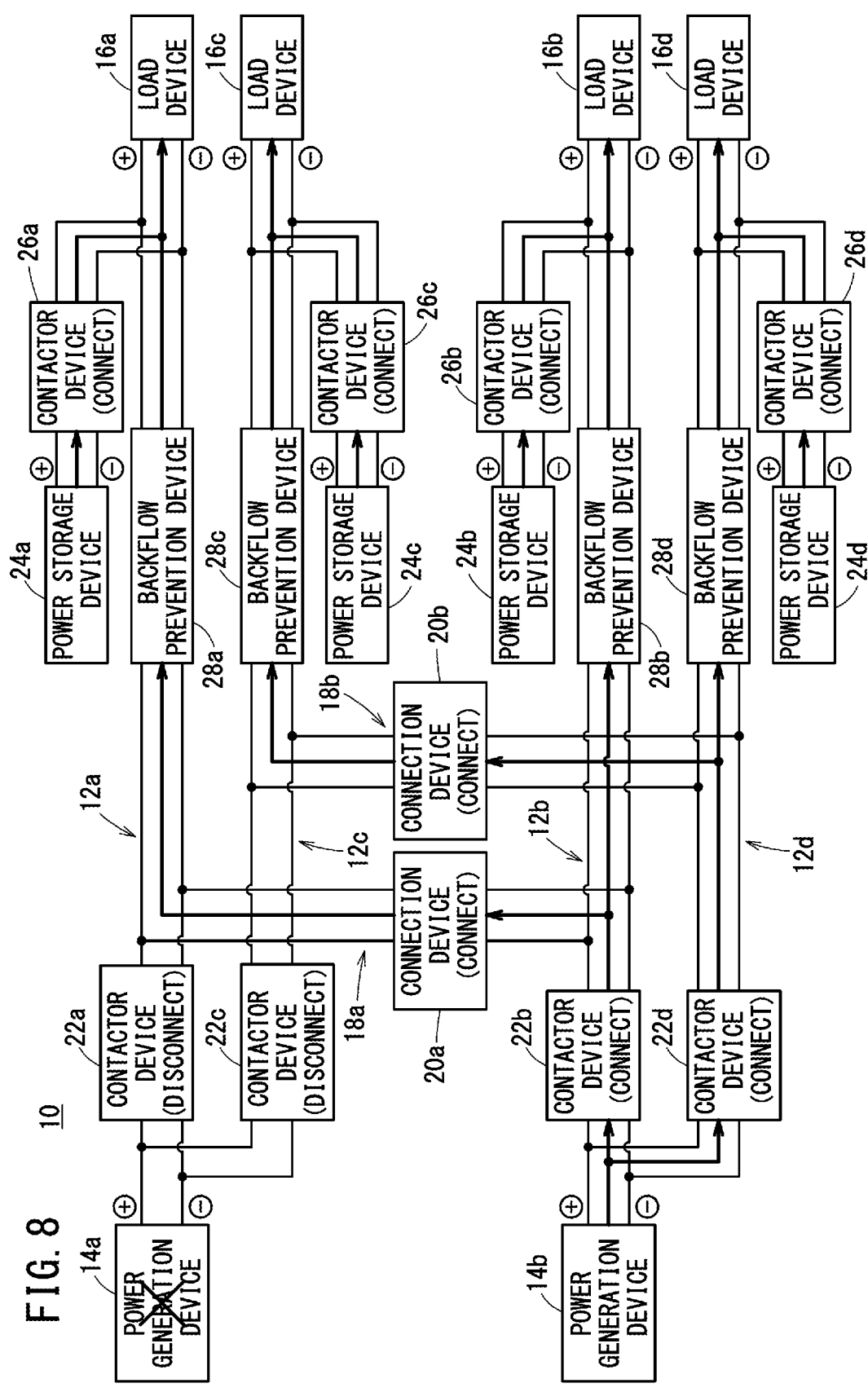
FIG. 8 is a diagram showing the operation of the power supply system in the event of an abnormality.

In the state shown in FIG. 7, the second load device 16*b* is supplied with electric power only from the second power storage device 24*b*, and the fourth load device 16*d* is supplied with electric power only from the fourth power storage device 24*d*. Therefore, the output voltage of the second power storage device 24*b* and the output voltage of the fourth power storage device 24*d* decrease. As a result, the output voltage of the second power storage device 24*b* and the output voltage of the fourth power storage device 24*d* become lower than the output voltage of the second power generation device 14*b*. As a result, as shown in FIG. 8, electric power is supplied from the second power generation device 14*b* to the second load device 16*b* and the fourth load device 16*d*.

[Configuration of Control Device]

Figure 9:
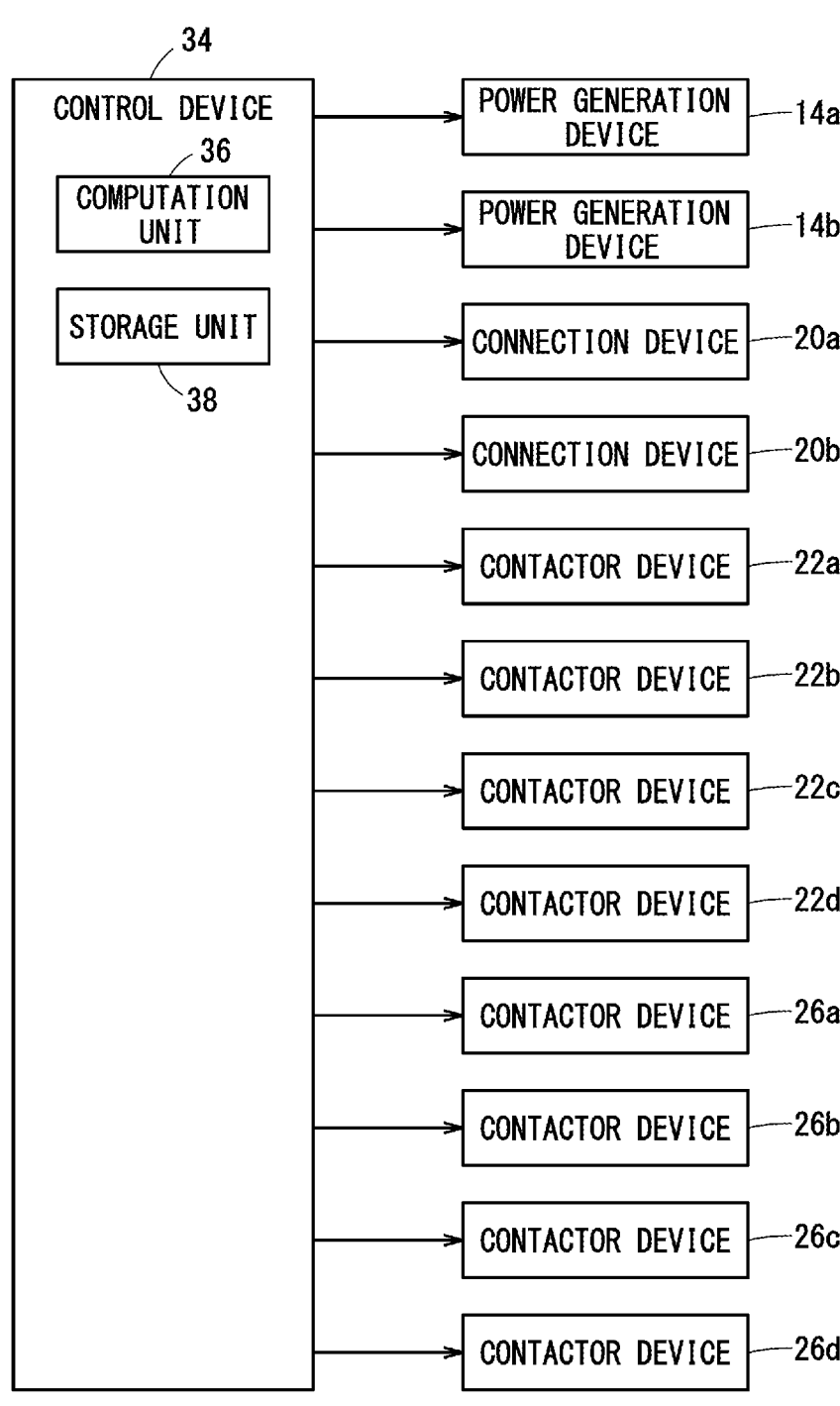
FIG. 9 is a control block diagram of a control device.

The power supply system 10 includes a control device 34. FIG. 9 is a control block diagram of the control device 34. The control device 34 controls the first power generation device 14*a*, the second power generation device 14*b*, the first connection device 20*a*, the second connection device 20*b*, the contactor devices 22*a* to 22*d*, and the contactor devices 26*a* to 26*d*.

The control device 34 includes a computation unit 36 and a storage unit 38. The computation unit 36 is, for example, a processor such as a central processing unit (CPU) or a graphics processing unit (GPU). The computation unit 36 controls each device by executing a program stored in the storage unit 38. At least part of the computation unit 36 may be realized by an integrated circuit such as an application specific integrated circuit (ASIC) or a field-programmable gate array (FPGA). At least part of the computation unit 36 may be realized by an electronic circuit including a discrete device.

The storage unit 38 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage unit 38 may be included in the processor, the integrated circuit, or the like described above.

[Fail-Safe Control]

Figure 10:
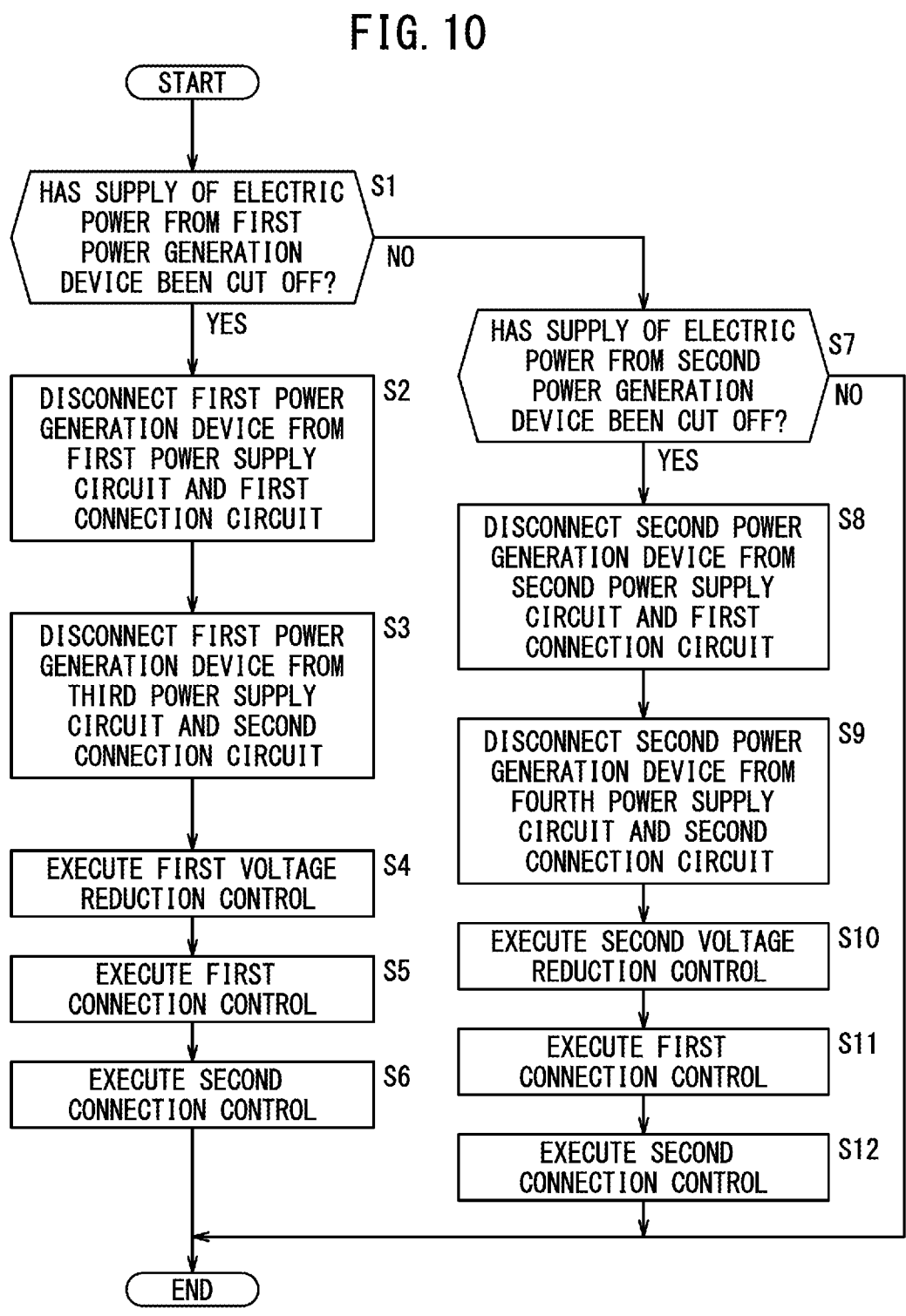
FIG. 10 is a flowchart showing fail-safe control.

FIG. 10 is a flowchart showing fail-safe control. The fail-safe control is repeatedly executed at a predetermined cycle.

In step S1, the control device 34 determines whether or not the supply of electric power from the first power generation device 14*a* to the first power supply circuit 12*a* and the third power supply circuit 12*c* has been cut off. When it is determined that the supply of electric power from the first power generation device 14*a* to the first power supply circuit 12*a* and the third power supply circuit 12*c* has been cut off (step S1: YES), the process proceeds to step S2.

In step S2, the control device 34 controls the contactor device 22*a* to disconnect the first power generation device 14*a* from the first power supply circuit 12*a* and the first connection circuit 18*a*. Thereafter, the process proceeds to step S3.

In step S3, the control device 34 controls the contactor device 22*c* to disconnect the first power generation device 14*a* from the third power supply circuit 12*c* and the second connection circuit 18*b*. Thereafter, the process proceeds to step S4.

In step S4, the control device 34 executes the first voltage reduction control on the second power generation device 14*b*. As a result, the difference between the output voltage of the second power generation device 14*b* and the output voltage of the first power storage device 24*a*, and the difference between the output voltage of the second power generation device 14*b* and the output voltage of the third power storage device 24*c*, are made equal to or less than the voltage threshold. Thereafter, the process proceeds to step S5.

In step S5, the control device 34 executes the first connection control on the first connection device 20*a*. As a result, the first power supply circuit 12*a* and the second power supply circuit 12*b* are connected to each other via the first connection circuit 18*a*. Thereafter, the process proceeds to step S6.

In step S6, the control device 34 executes the second connection control on the second connection device 20*b*. As a result, the third power supply circuit 12*c* and the fourth power supply circuit 12*d* are connected to each other via the second connection circuit 18*b*. Thereafter, the fail-safe control is ended.

In step S1, when it is determined that electric power is being supplied from the first power generation device 14*a* to the first power supply circuit 12*a* and the third power supply circuit 12*c* (step S1: NO), the process proceeds to step S7.

In step S7, the control device 34 determines whether or not the supply of electric power from the second power generation device 14*b* to the second power supply circuit 12*b* and the fourth power supply circuit 12*d* has been cut off. When it is determined that the supply of electric power from the second power generation device 14*b* to the second power supply circuit 12*b* and the fourth power supply circuit 12*d* has been cut off (step S7: YES), the process proceeds to step S8. When it is determined that electric power is being supplied from the second power generation device 14*b* to the second power supply circuit 12*b* and the fourth power supply circuit 12*d* (step S7: NO), the fail-safe control is ended.

In step S8, the control device 34 controls the contactor device 22*b* to disconnect the second power generation device 14*b* from the second power supply circuit 12*b* and the first connection circuit 18*a*. Thereafter, the process proceeds to step S9.

In step S9, the control device 34 controls the contactor device 22*d* to disconnect the second power generation device 14*b* from the fourth power supply circuit 12*d* and the second connection circuit 18*b*. Thereafter, the process proceeds to step S10.

In step S10, the control device 34 executes second voltage reduction control on the first power generation device 14*a*. The second voltage reduction control is control for approximating the output voltage of the first power generation device 14*a* to the output voltage of the second power storage device 24*b* and the output voltage of the fourth power storage device 24*d*. As a result, a difference between the output voltage of the first power generation device 14*a* and the output voltage of the second power storage device 24*b*, and a difference between the output voltage of the first power generation device 14*a* and the output voltage of the fourth power storage device 24*d*, are made equal to or less than a voltage threshold. Thereafter, the process proceeds to step S11.

In step S11, the control device 34 executes the first connection control on the first connection device 20*a*. As a result, the first power supply circuit 12*a* and the second power supply circuit 12*b* are connected to each other via the first connection circuit 18*a*. Thereafter, the process proceeds to step S12.

In step S12, the control device 34 executes the second connection control on the second connection device 20*b*. As a result, the third power supply circuit 12*c* and the fourth power supply circuit 12d are connected to each other via the second connection circuit 18b. Thereafter, the fail-safe control is ended.

Comparison Between Power Supply System of Present Embodiment and Power Supply System of Comparative Example 1

Figure 11:
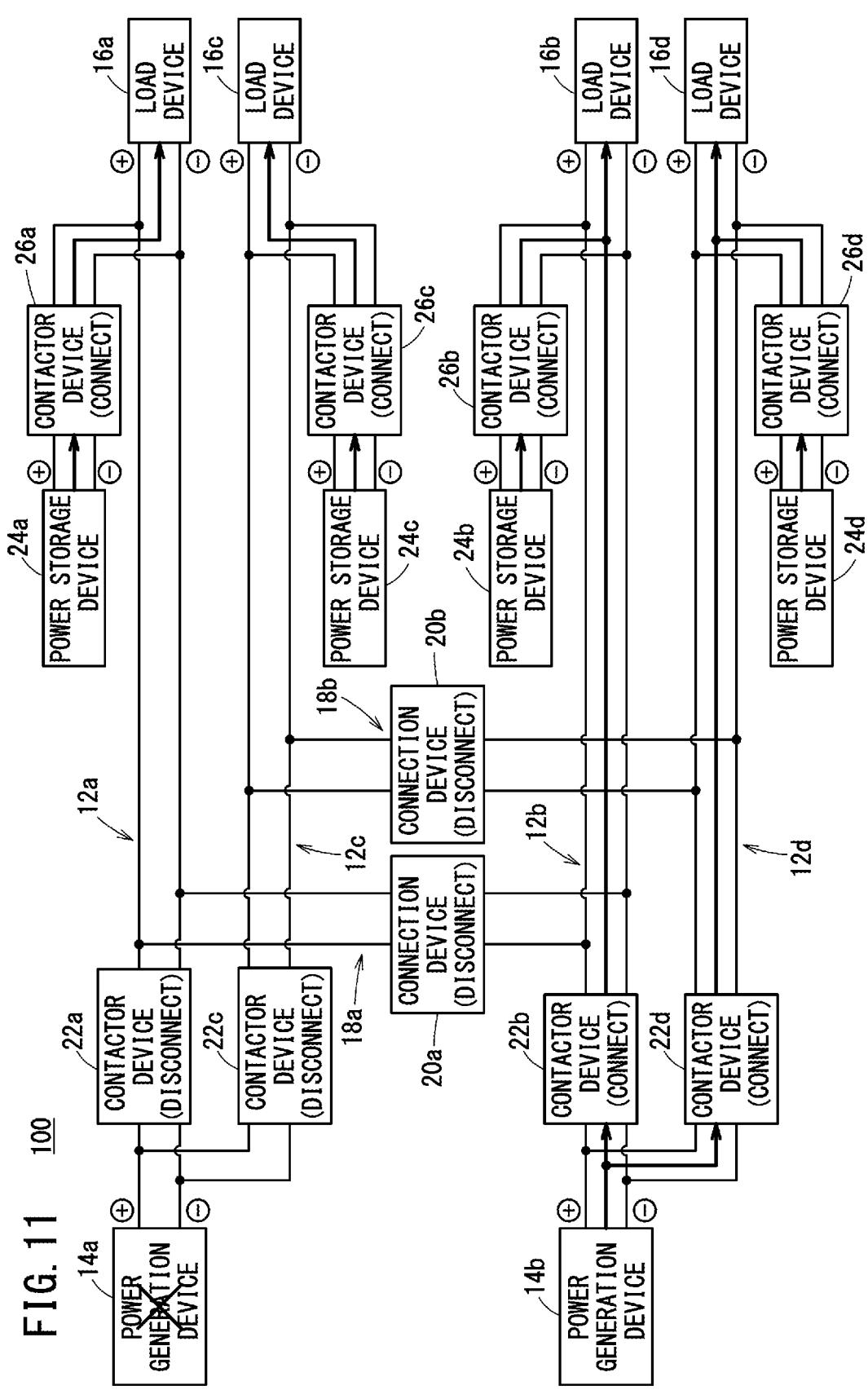
FIG. 11 is a diagram showing the operation of the power supply system in the event of an abnormality.
Figure 12:
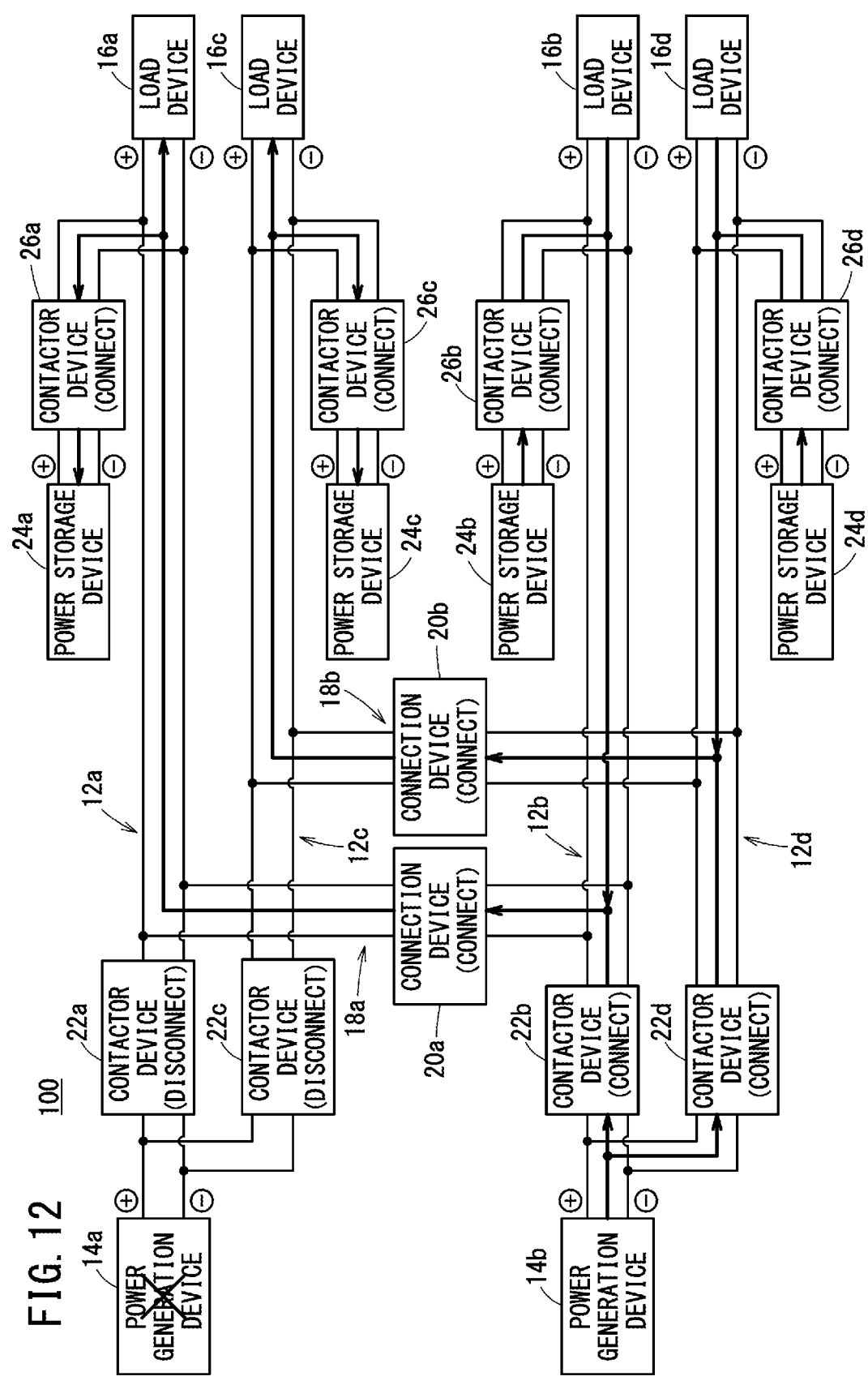
FIG. 12 is a diagram showing the operation of the power supply system in the event of an abnormality.

FIGS. 11 and 12 are diagrams showing the operation of a power supply system 100 of Comparative Example 1 in the event of an abnormality. Unlike the power supply system 10 (FIG. 1) of the present embodiment, the power supply system 100 shown in FIG. 11 does not include the backflow prevention devices 28a to 28d. FIGS. 11 and 12 show the operation of the power supply system 100 in a case where the supply of electric power from the first power generation device 14a to the first power supply circuit 12a and the third power supply circuit 12c is cut off.

In this case, the first power generation device 14a is disconnected from the first power supply circuit 12a and the first connection circuit 18a by the contactor device 22a. Further, the first power generation device 14a is disconnected from the third power supply circuit 12c and the second connection circuit 18b by the contactor device 22c.

The first load device 16a is supplied with electric power only from the first power storage device 24a, and the third load device 16c is supplied with electric power only from the third power storage device 24c. Therefore, the SOC of the first power storage device 24a and the SOC of the third power storage device 24c decrease. Accordingly, the output voltage of the first power storage device 24a and the output voltage of the third power storage device 24c decrease. On the other hand, the second load device 16b is supplied with electric power from the second power generation device 14b and the second power storage device 24b, and the fourth load device 16d is supplied with electric power from the second power generation device 14b and the fourth power storage device 24d. Thus, the SOC of the second power storage device 24b and the SOC of the fourth power storage device 24d hardly decrease. Therefore, the output voltage of the second power storage device 24b and the output voltage of the fourth power storage device 24d hardly decrease. As a result, the output voltage of the first power storage device 24a and the output voltage of the third power storage device 24c become lower than the output voltage of the second power storage device 24b and the output voltage of the fourth power storage device 24d.

The power supply system 100 does not include the backflow prevention device 28b and the backflow prevention device 28d. Since the second power storage device 24b and the fourth power storage device 24d stably output voltages, the output voltage of the second power generation device 14b becomes substantially the same as the output voltage of the second power storage device 24b and the output voltage of the fourth power storage device 24d.

As shown in FIG. 12, if the first power supply circuit 12a and the second power supply circuit 12b are connected to each other by the first connection device 20a in this state, an overcurrent may flow through the first power supply circuit 12a and the second power supply circuit 12b. Similarly, if the third power supply circuit 12c and the fourth power supply circuit 12d are connected to each other by the second connection device 20b in this state, an overcurrent may flow through the third power supply circuit 12c and the fourth power supply circuit 12d. Therefore, the second power generation device 14b, the first load device 16a, the second load device 16b, the third load device 16c, the fourth load device 16d, the first power storage device 24a, the second power storage device 24b, the third power storage device 24c, and the fourth power storage device 24d may be damaged.

Since the power supply system 10 of the present embodiment includes the backflow prevention device 28a and the backflow prevention device 28c, the output voltage of the first power generation device 14a can be made lower than the output voltage of the first power storage device 24a and the output voltage of the third power storage device 24c. In addition, since the power supply system 10 of the present embodiment includes the backflow prevention device 28b and the backflow prevention device 28d, the output voltage of the second power generation device 14b can be made lower than the output voltage of the second power storage device 24b and the output voltage of the fourth power storage device 24d.

Figure 13:
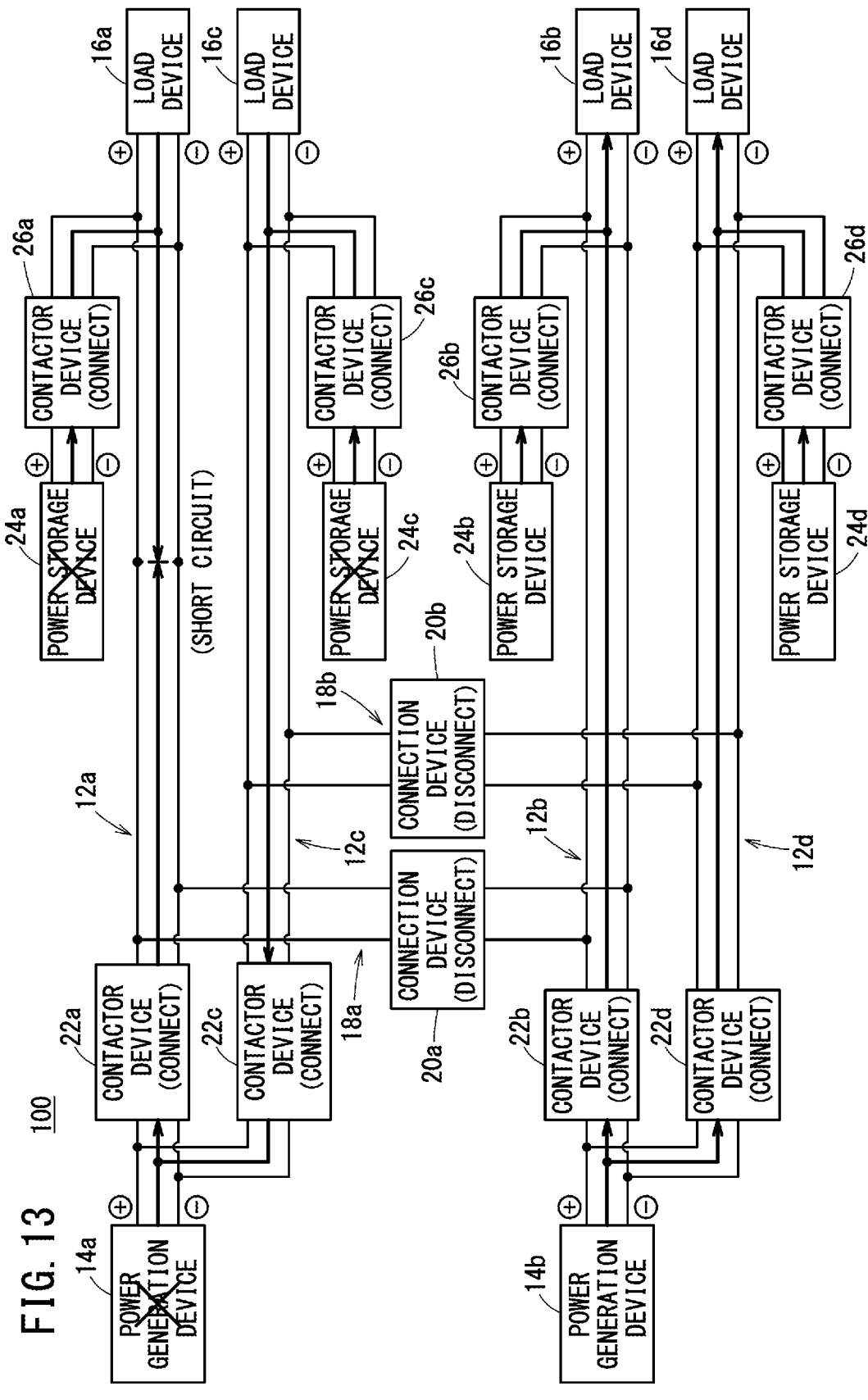
FIG. 13 is a diagram showing the operation of the power supply system in the event of an abnormality.

FIG. 13 is a diagram showing the operation of the power supply system 100 in the event of an abnormality. FIG. 13 shows a state in which a short circuit has occurred between the contactor device 22a, and the first load device 16a and the first power storage device 24a.

In this case, an overcurrent may flow between the location where the short circuit has occurred, and the first power generation device 14a, the first load device 16a, the first power storage device 24a, the third load device 16c, and the third power storage device 24c. Therefore, the first power generation device 14a, the first load device 16a, the first power storage device 24a, the third load device 16c, and the third power storage device 24c may be damaged. As a result, there is a possibility that the driving of the first load device 16a and the third load device 16c cannot be continued.

Figure 14:
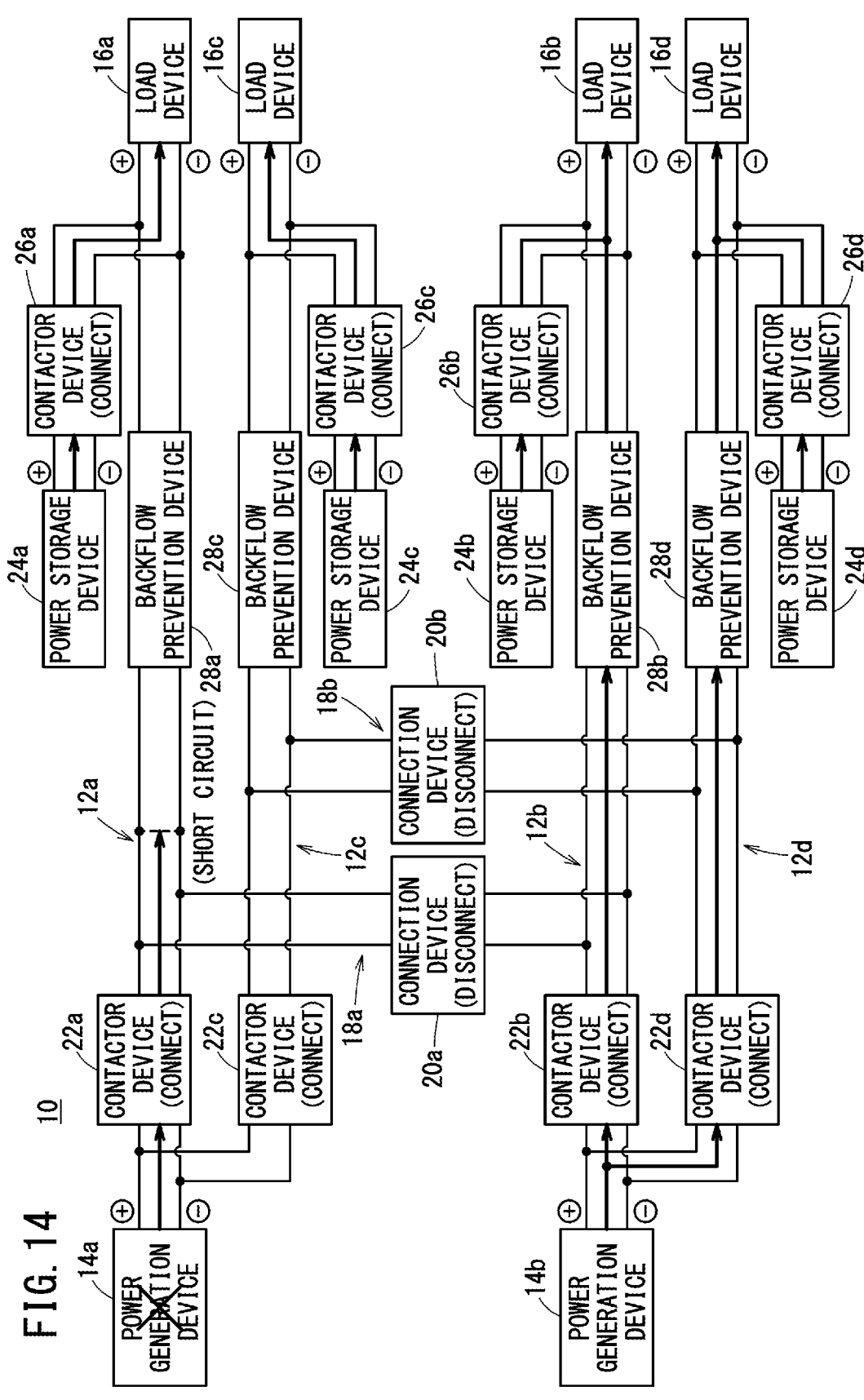
FIG. 14 is a diagram showing the operation of the power supply system in the event of an abnormality.

FIG. 14 is a diagram showing the operation of the power supply system 10 in the event of an abnormality. FIG. 14 shows a state in which a short circuit has occurred between the contactor device 22a and the backflow prevention device 28a.

In this case, an overcurrent may flow between the location where the short circuit has occurred, and the first power generation device 14a. However, since the power supply system 10 of the present embodiment includes the backflow prevention device 28a and the backflow prevention device 28c, no overcurrent flows between the location where the short circuit has occurred, and the first load device 16a, the first power storage device 24a, the third load device 16c, and the third power storage device 24c. Therefore, the driving of the first load device 16a and the third load device 16c can be continued.

Figure 15:
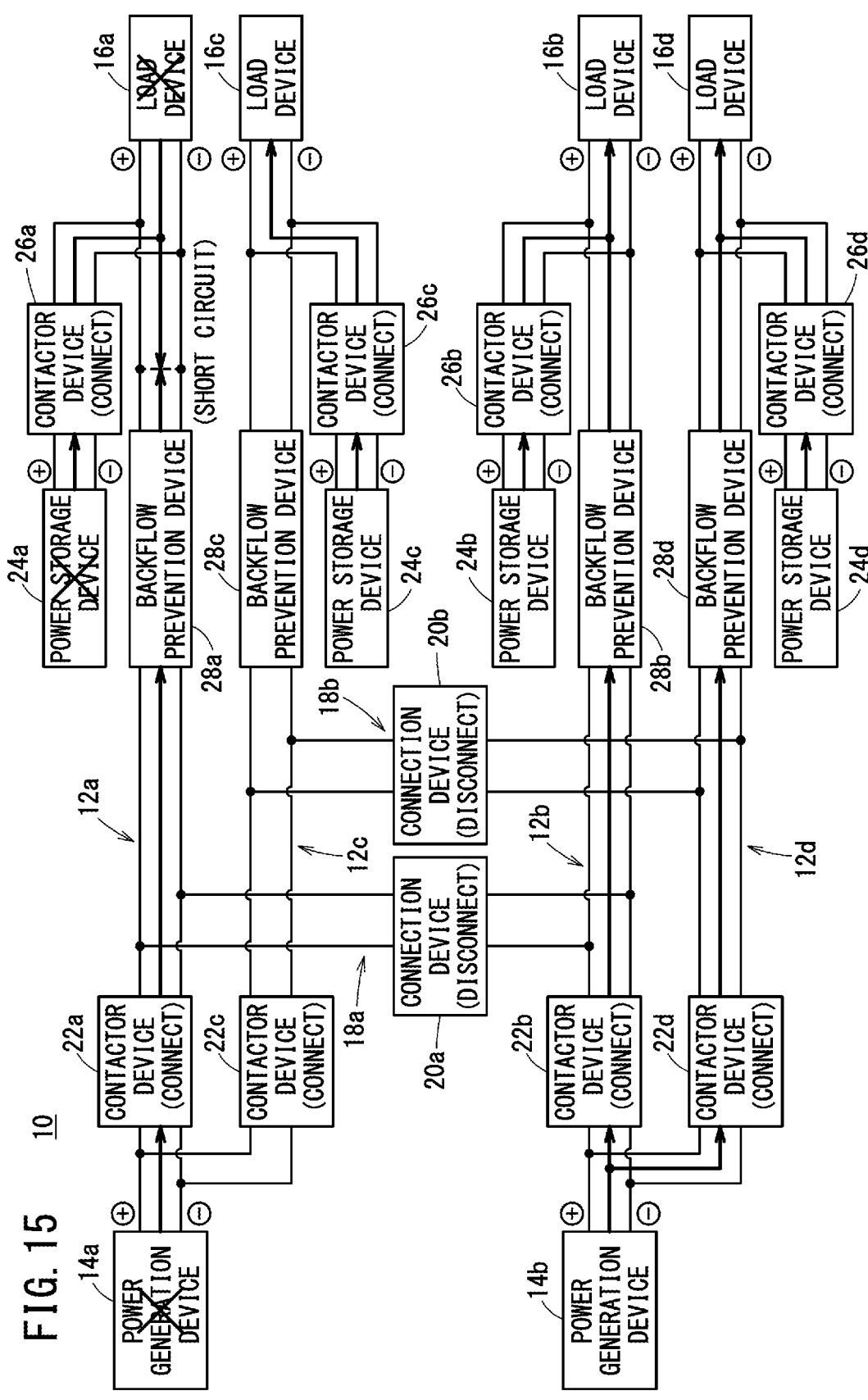
FIG. 15 is a diagram showing the operation of the power supply system in the event of an abnormality.

FIG. 15 is a diagram showing the operation of the power supply system 10 in the event of an abnormality. FIG. 15 shows a state in which a short circuit has occurred between the backflow prevention device 28a, and the first load device 16a and the first power storage device 24a.

In this case, an overcurrent may flow between the location where the short circuit has occurred, and the first power generation device 14a, the first load device 16a, and the first power storage device 24a. However, since the power supply system 10 of the present embodiment includes the backflow prevention device 28c, no overcurrent flows between the location where the short circuit has occurred, and the third load device 16c and the third power storage device 24c. Therefore, the driving of the third load device 16c can be continued.

Comparison Between Power Supply System of Present Embodiment and Power Supply System of Comparative Example 2

Figure 16:
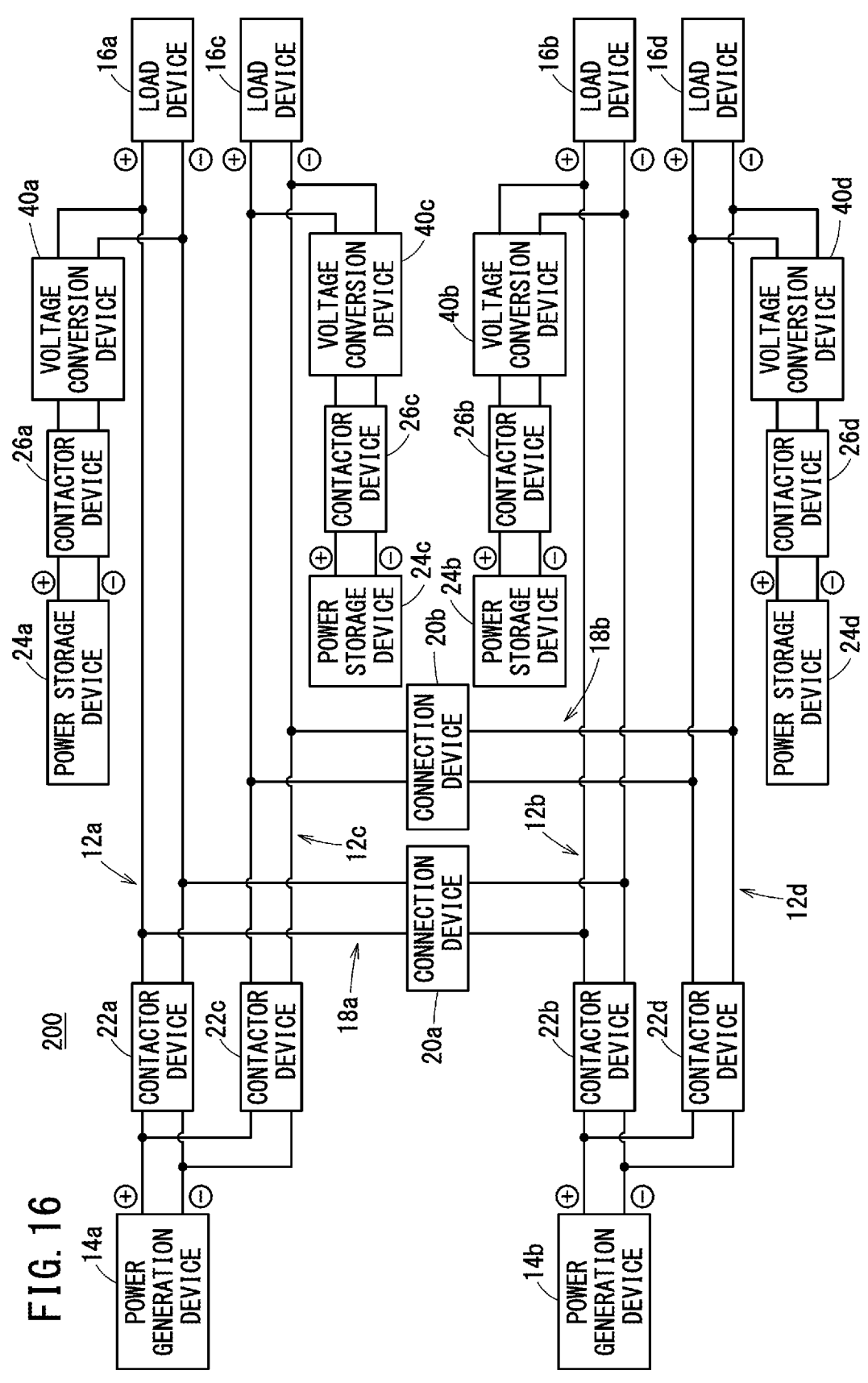
FIG. 16 is a schematic view of the power supply system.

FIG. 16 is a schematic view of a power supply system 200 of Comparative Example 2. The power supply system 200 includes voltage conversion devices 40a to 40d. The voltage conversion devices 40a to 40d are DC/DC converters.

When the supply of electric power from the first power generation device 14a to the first power supply circuit 12a and the third power supply circuit 12c is cut off, the power supply system 200 makes the output voltage of the voltage conversion device 40b lower than the output voltage of the second power storage device 24b. Further, the power supply system 200 makes the output voltage of the voltage conversion device 40d lower than the output voltage of the fourth power storage device 24d. As a result, the output voltage of the second power generation device 14b can be made lower than the output voltage of the second power storage device 24b and the output voltage of the fourth power storage device 24d.

Therefore, when the first power supply circuit 12a and the second power supply circuit 12b are connected to each other by the first connection device 20a, it is possible to prevent an overcurrent from flowing through the first power supply circuit 12a and the second power supply circuit 12b. Similarly, when the third power supply circuit 12c and the fourth power supply circuit 12d are connected to each other by the second connection device 20b, it is possible to prevent an overcurrent from flowing through the third power supply circuit 12c and the fourth power supply circuit 12d.

However, the voltage conversion devices 40a to 40d are heavier than the backflow prevention devices 28a to 28d. Accordingly, the power supply system 10 of the present embodiment can be reduced in weight by including the backflow prevention devices 28a to 28d.

Second Embodiment

The configuration of the power supply system 10 of the present embodiment is the same as the configuration of the power supply system 10 of the first embodiment. The fail-safe control executed by the control device 34 of the present embodiment is partially different from the fail-safe control executed by the control device 34 of the first embodiment.

[Operation of Power Supply System in Event of Abnormality]

FIGS. 17 to 20 are diagrams showing the operation of the power supply system 10 in the event of an abnormality. Arrows shown in FIGS. 17 to 20 indicate electric power supply paths. FIGS. 17 to 20 show the operation of the power supply system 10 in a case where the supply of electric power from the first power generation device 14a to the first load device 16a is stopped.

The state in which the supply of electric power from the first power generation device 14a to the first load device 16a is stopped is, for example, a state in which the first load device 16a is stopped and cannot be restarted, or a state in which a short circuit, disconnection, or the like has occurred between the contactor device 22a and the first load device 16a.

Figure 17:
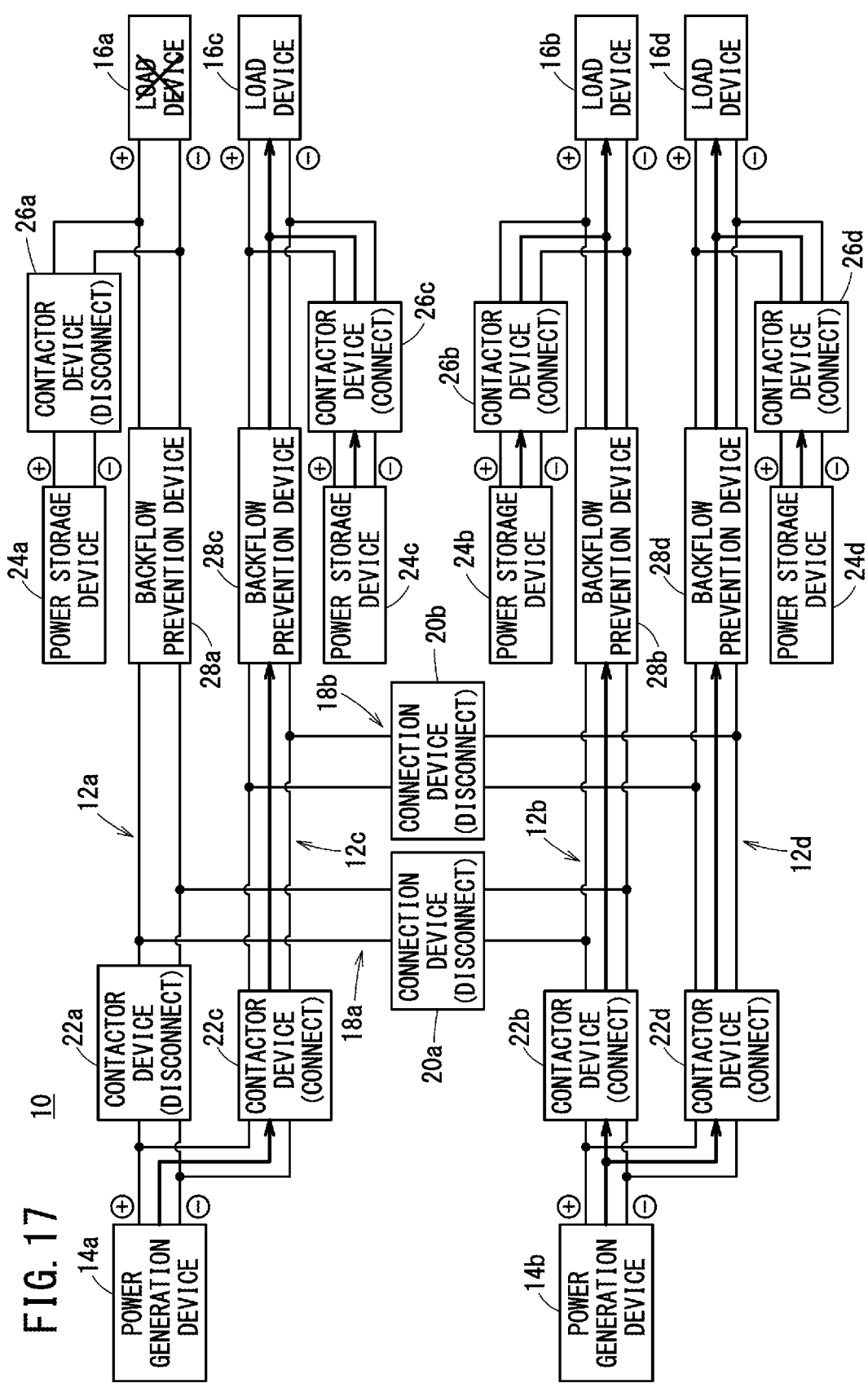
FIG. 17 is a diagram showing the operation of the power supply system in the event of an abnormality.

In this case, as shown in FIG. 17, the first power generation device 14a is disconnected from the first power supply circuit 12a and the first connection circuit 18a by the contactor device 22a.

The first power generation device 14a supplies electric power only to the third load device 16c. On the other hand, the second power generation device 14b supplies electric power to both the second load device 16b and the fourth load device 16d. Therefore, the SOC of the second power storage device 24b and the SOC of the fourth power storage device 24d become lower than the SOC of the third power storage device 24c. As a result, the output voltage of the second power storage device 24b and the output voltage of the fourth power storage device 24d become lower than the output voltage of the third power storage device 24c.

In a case where electric power is supplied from the first power generation device 14a to the third load device 16c, the output voltage of the first power generation device 14a is controlled to be higher than the output voltage of the third load device 16c. Therefore, the output voltage of the first power generation device 14a is higher than the output voltage of the second power storage device 24b and the output voltage of the fourth power storage device 24d.

If the third power supply circuit 12c and the fourth power supply circuit 12d are connected to each other in this state, an overcurrent may flow through the second power generation device 14b, the second load device 16b, the second power storage device 24b, the fourth load device 16d, and the fourth power storage device 24d. Therefore, the second power generation device 14b, the second load device 16b, the second power storage device 24b, the fourth load device 16d, and the fourth power storage device 24d may be damaged.

In the power supply system 10 of the present embodiment, the second voltage reduction control is executed on the first power generation device 14a. The second voltage reduction control is control for approximating the output voltage of the first power generation device 14a to the output voltage of the second power storage device 24b and the output voltage of the fourth power storage device 24d. The second voltage reduction control is executed until the difference between the output voltage of the first power generation device 14a and the output voltage of the second power storage device 24b, and the difference between the output voltage of the first power generation device 14a and the output voltage of the fourth power storage device 24d become equal to or less than a predetermined voltage threshold.

Figure 18:
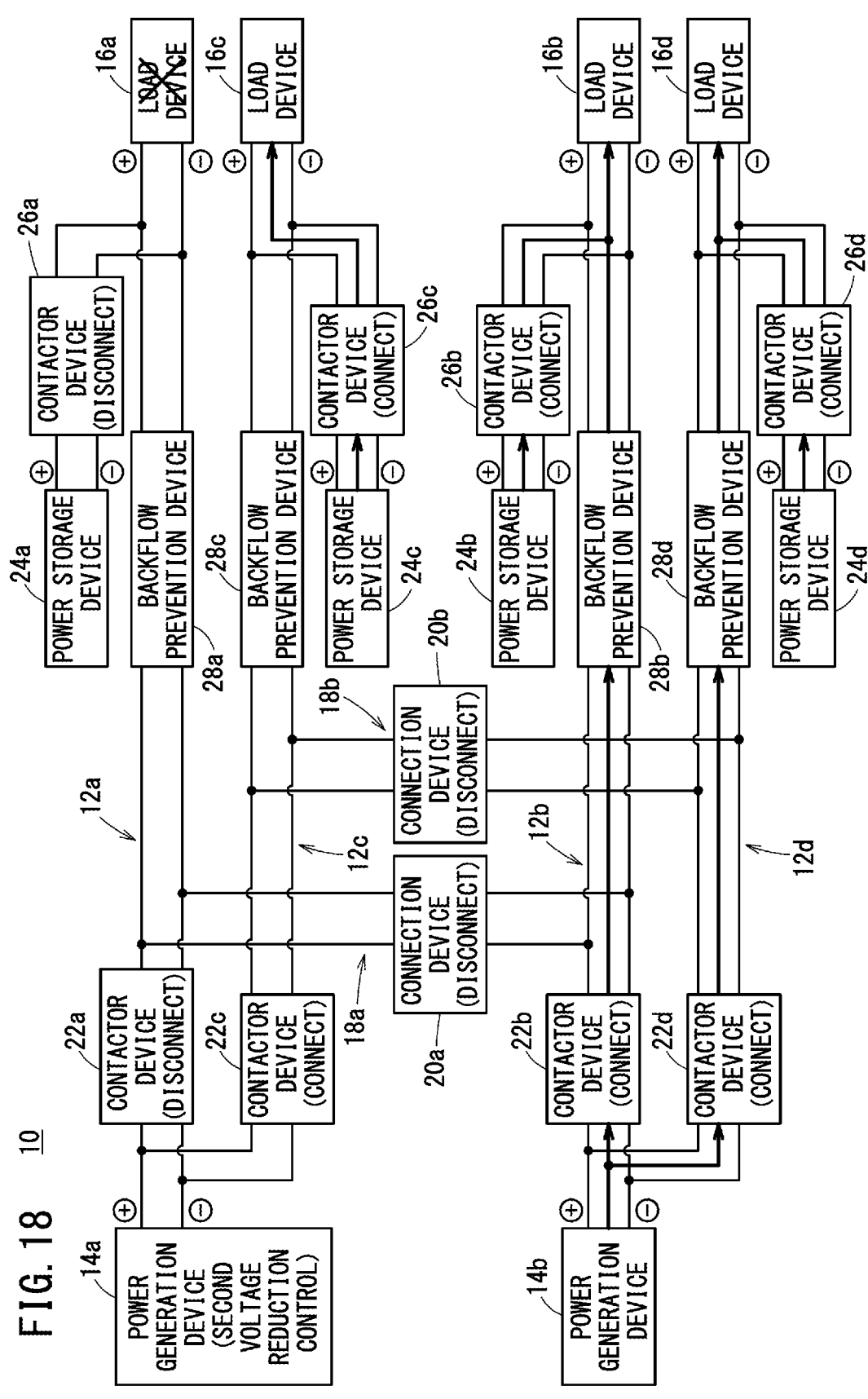
FIG. 18 is a diagram showing the operation of the power supply system in the event of an abnormality.

When the second voltage reduction control is executed on the first power generation device 14a, the output voltage of the first power generation device 14a becomes lower than the output voltage of the third power storage device 24c. Therefore, as shown in FIG. 18, the supply of electric power from the first power generation device 14a to the third load device 16c is restricted by the backflow prevention device 28c.

Figure 19:
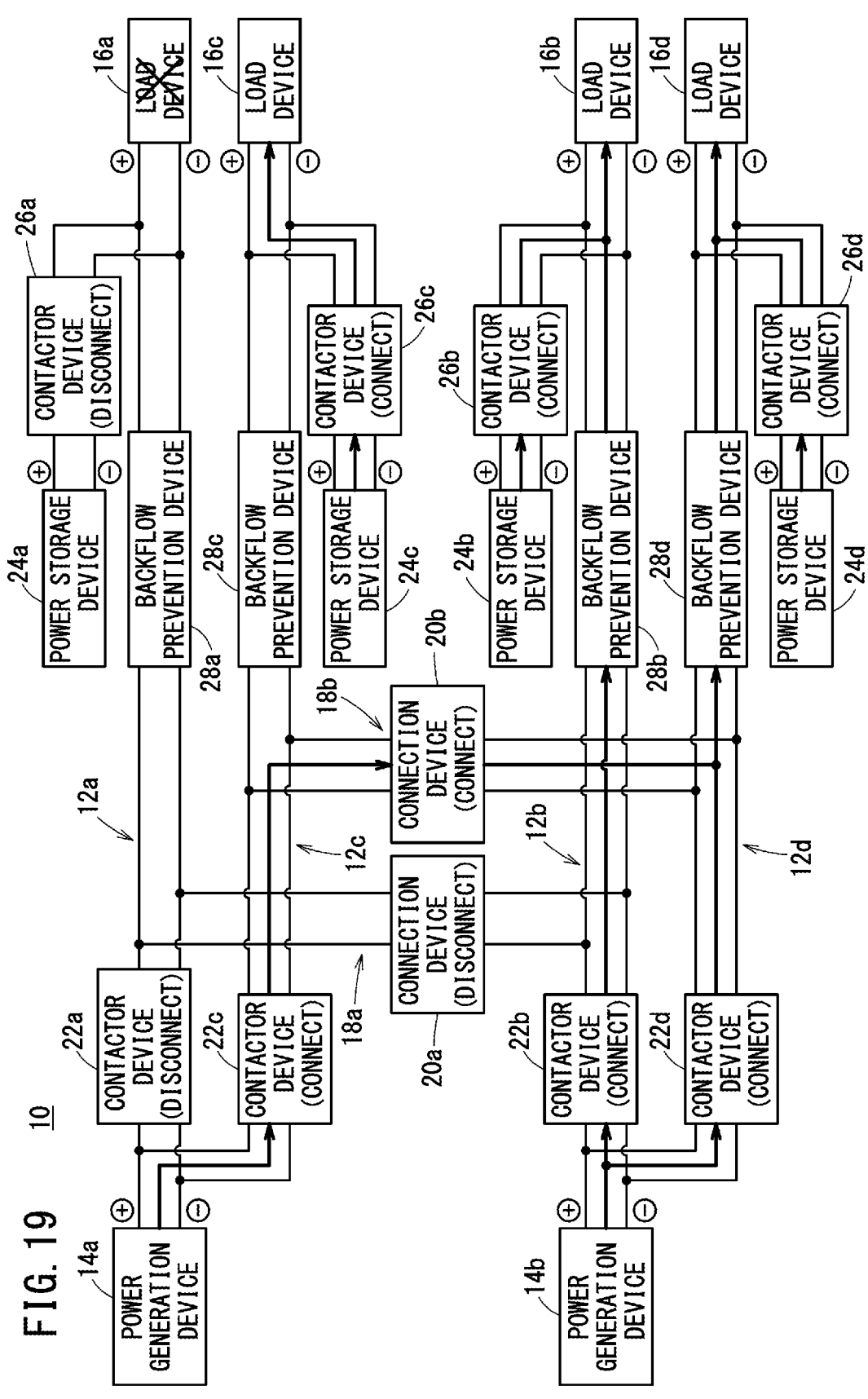
FIG. 19 is a diagram showing the operation of the power supply system in the event of an abnormality.

When the difference between the output voltage of the first power generation device 14a and the output voltage of the fourth power storage device 24d becomes equal to or less than the voltage threshold, then as shown in FIG. 19, the third power supply circuit 12c and the fourth power supply circuit 12d are connected to each other by the second connection device 20b. As a result, electric power is supplied from the first power generation device 14a to the second load device 16b and the fourth load device 16d.

In the state shown in FIG. 19, the third load device 16c is supplied with electric power only from the third power storage device 24c. As a result, the SOC of the third power storage device 24c decreases, and the output voltage of the third power storage device 24c decreases.

Figure 20:
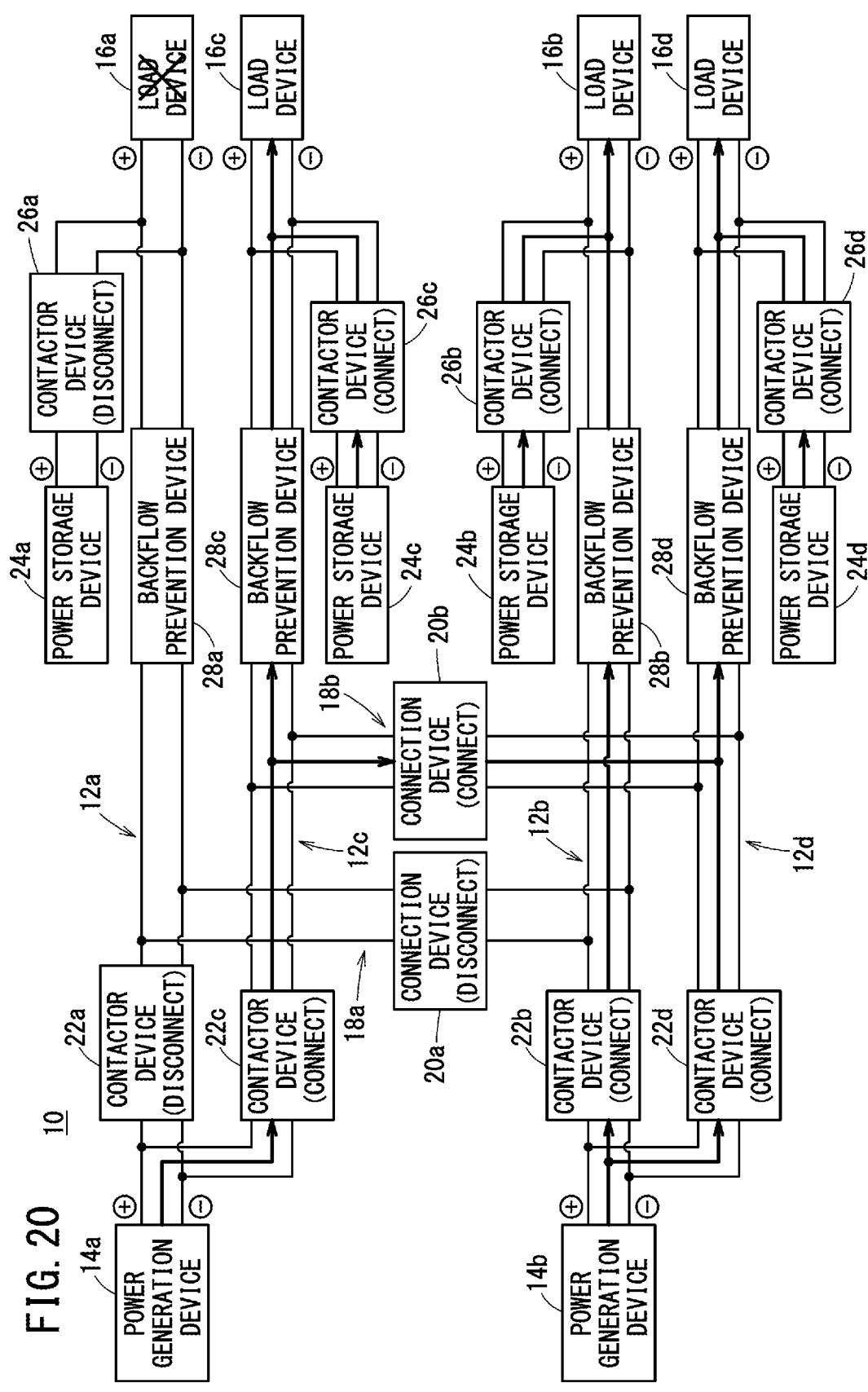
FIG. 20 is a diagram showing the operation of the power supply system in the event of an abnormality.

When the output voltage of the third power storage device 24c becomes lower than the output voltage of the first power generation device 14a, then as shown in FIG. 20, electric power is supplied from the first power generation device 14a to the third load device 16c.

[Fail-Safe Control]

Figure 21:
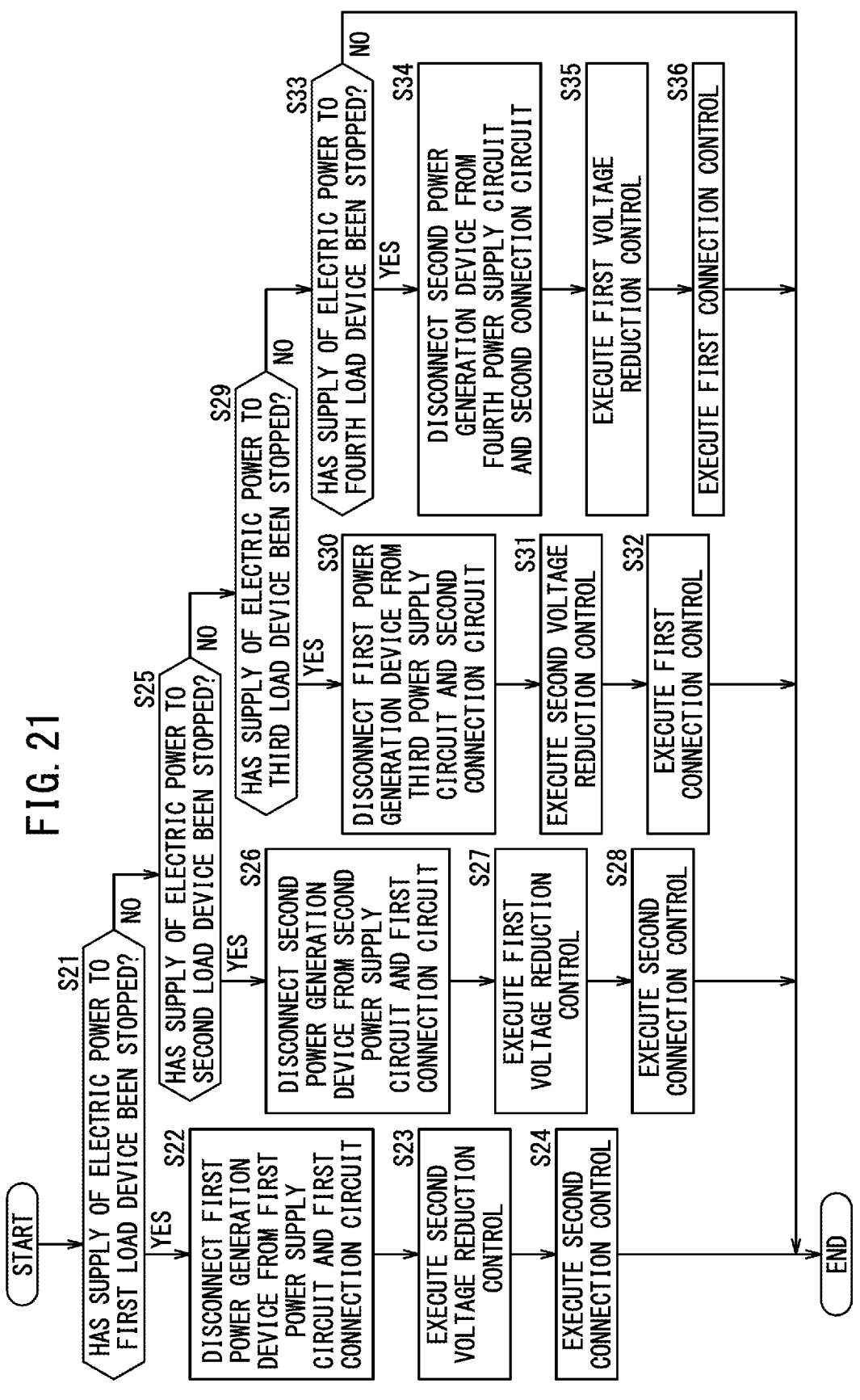
FIG. 21 is a flowchart showing the fail-safe control.

FIG. 21 is a flowchart showing the fail-safe control. The fail-safe control is repeatedly executed at a predetermined cycle.

In step S21, the control device 34 determines whether or not the supply of electric power from the first power generation device 14a to the first load device 16a has been stopped. When it is determined that the supply of electric power from the first power generation device 14a to the first load device 16a has been stopped (step S21: YES), the process proceeds to step S22.

In step S22, the control device 34 controls the contactor device 22a to disconnect the first power generation device 14a from the first power supply circuit 12a and the first connection circuit 18a. Thereafter, the process proceeds to step S23.

In step S23, the control device 34 executes the second voltage reduction control on the first power generation device 14a. As a result, the difference between the output voltage of the first power generation device 14a and the output voltage of the second power storage device 24b, and the difference between the output voltage of the first power generation device 14a and the output voltage of the fourth power storage device 24d, are made equal to or less than the voltage threshold. Thereafter, the process proceeds to step S24.

In step S24, the control device 34 executes the second connection control on the second connection device 20b. As a result, the third power supply circuit 12c and the fourth power supply circuit 12d are connected to each other via the second connection circuit 18b. Thereafter, the fail-safe control is ended.

In step S21, when it is determined that electric power is being supplied from the first power generation device 14a to the first load device 16a (step S21: NO), the process proceeds to step S25.

In step S25, the control device 34 determines whether or not the supply of electric power from the second power generation device 14b to the second load device 16b has been stopped. When it is determined that the supply of electric power from the second power generation device 14b to the second load device 16b has been stopped (step S25: YES), the process proceeds to step S26.

In step S26, the control device 34 controls the contactor device 22b to disconnect the second power generation device 14b from the second power supply circuit 12b and the first connection circuit 18a. Thereafter, the process proceeds to step S27.

In step S27, the control device 34 executes the first voltage reduction control on the second power generation device 14b. As a result, the difference between the output voltage of the second power generation device 14b and the output voltage of the first power storage device 24a, and the difference between the output voltage of the second power generation device 14b and the output voltage of the third power storage device 24c, are made equal to or less than the voltage threshold. Thereafter, the process proceeds to step S28.

In step S28, the control device 34 executes the second connection control on the second connection device 20b. As a result, the third power supply circuit 12c and the fourth power supply circuit 12d are connected to each other via the second connection circuit 18b. Thereafter, the fail-safe control is ended.

In step S25, when it is determined that electric power is being supplied from the second power generation device 14b to the second load device 16b (step S25: NO), the process proceeds to step S29.

In step S29, the control device 34 determines whether or not the supply of electric power from the first power generation device 14a to the third load device 16c has been stopped. When it is determined that the supply of electric power from the first power generation device 14a to the third load device 16c has been stopped (step S29: YES), the process proceeds to step S30.

In step S30, the control device 34 controls the contactor device 22c to disconnect the first power generation device 14a from the third power supply circuit 12c and the second connection circuit 18b. Thereafter, the process proceeds to step S31.

In step S31, the control device 34 executes the second voltage reduction control on the first power generation device 14a. As a result, the difference between the output voltage of the first power generation device 14a and the output voltage of the second power storage device 24b, and the difference between the output voltage of the first power generation device 14a and the output voltage of the fourth power storage device 24d, are made equal to or less than the voltage threshold. Thereafter, the process proceeds to step S32.

In step S32, the control device 34 executes the first connection control on the first connection device 20a. As a result, the first power supply circuit 12a and the second power supply circuit 12b are connected to each other via the first connection circuit 18a. Thereafter, the fail-safe control is ended.

In step S29, when it is determined that electric power is being supplied from the first power generation device 14a to the third load device 16c (step S29: NO), the process proceeds to step S33.

In step S33, the control device 34 determines whether or not the supply of electric power from the second power generation device 14b to the fourth load device 16d has been stopped. When it is determined that the supply of electric power from the second power generation device 14b to the fourth load device 16d has been stopped (step S33: YES), the process proceeds to step S34. When it is determined that electric power is being supplied from the second power generation device 14b to the fourth load device 16d (step S33: NO), the fail-safe control is ended.

In step S34, the control device 34 controls the contactor device 22d to disconnect the second power generation device 14b from the fourth power supply circuit 12d and the second connection circuit 18b. Thereafter, the process proceeds to step S35.

In step S35, the control device 34 executes the first voltage reduction control on the second power generation device 14b. As a result, the difference between the output voltage of the second power generation device 14b and the output voltage of the first power storage device 24a, and the difference between the output voltage of the second power generation device 14b and the output voltage of the third power storage device 24c, are made equal to or less than the voltage threshold. Thereafter, the process proceeds to step S36.

In step S36, the control device 34 executes the first connection control on the first connection device 20a. As a result, the first power supply circuit 12a and the second power supply circuit 12b are connected to each other via the first connection circuit 18a. Thereafter, the fail-safe control is ended.

It should be noted that both the fail-safe control of the present embodiment and the fail-safe control of the first embodiment may be performed.

Third Embodiment

Figure 22:
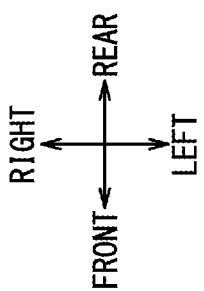
FIG. 22 is a schematic view of a moving object.
Figure 22:
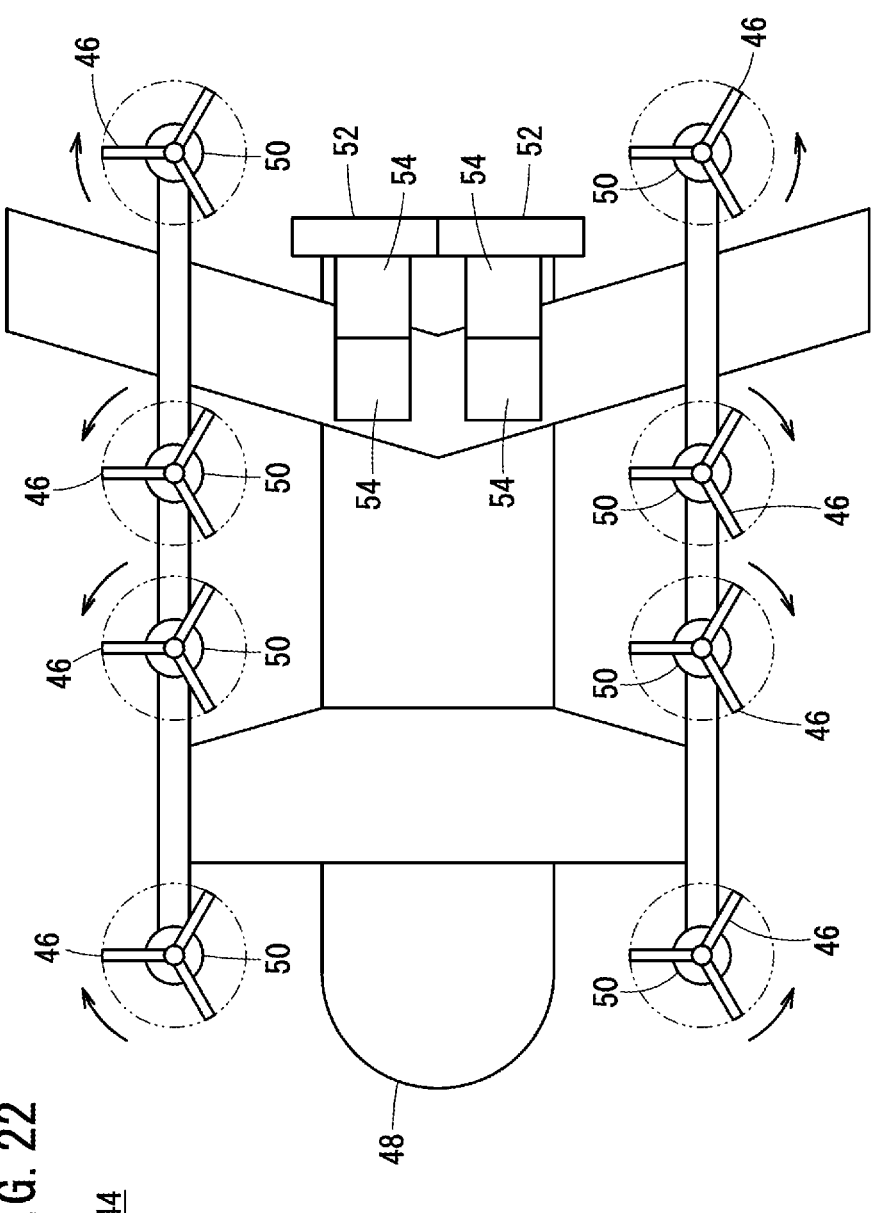

FIG. 22 is a schematic view of a moving object 44. The power supply system 10 is mounted on the moving object 44.

The moving object 44 of the present embodiment is an electric vertical take-off and landing aircraft (eVTOL aircraft). The moving object 44 includes eight VTOL rotors 46. The VTOL rotors 46 generate upward thrust for a fuselage 48. The moving object 44 includes eight electric motors 50. One electric motor 50 drives one VTOL rotor 46. The moving object 44 includes two cruise rotors 52. The cruise rotors 52 generate forward thrust for the fuselage 48. The moving object 44 includes four electric motors 54. Two electric motors 54 drive one cruise rotor 52.

Each of the first load device 16a, the second load device 16b, the third load device 16c, and the fourth load device 16d may include two electric motors 50 and one electric motor 54. Each of the first load device 16a, the second load device 16b, the third load device 16c, and the fourth load device 16d may include a low-voltage drive device in addition to the electric motors 50 and the electric motor 54.

The moving object 44 is not limited to an aircraft, and may be a ship, an automobile, a train, or the like.

The following notes (appendices) are further disclosed in relation to the above-described embodiments.

(Appendix 1)

Provided is the power supply system (10) including: the first power supply circuit (12a) configured to supply, to the first load device (16a), DC power output from the first power generation device (14a); the first power storage device (24a) connected to the first power supply circuit in parallel with the first power generation device; the second power supply circuit (12b) configured to supply, to the second load device (16b), DC power output from the second power generation device (14b); the second power storage device (24b) connected to the second power supply circuit in parallel with the second power generation device; the first connection circuit (18a) including the first connection device (20a) configured to connect the first power supply circuit and the second power supply circuit to each other; and the control device (34) configured to execute, on the first connection device, the first connection control for connecting the first power supply circuit and the second power supply circuit to each other via the first connection circuit, wherein, in a case where the electric power output from the second power generation device is supplied to the first load device, the control device executes, on the second power generation device, the first voltage reduction control for approximating the output voltage of the second power generation device to the output voltage of the first power storage device, and thereafter executes the first connection control. According to such a configuration, when the control device executes the first connection control on the first connection device, it is possible to suppress the flow of an overcurrent through the first load device and the first power storage device. Therefore, damage to the first load device and the first power storage device can be suppressed. This in turn contributes to energy efficiency.

(Appendix 2)

In the power supply system according to Appendix 1, in the case where the electric power output from the second power generation device is supplied to the first load device, the control device may execute the first connection control after executing the first voltage reduction control on the second power generation device until a difference between the output voltage of the second power generation device and the output voltage of the first power storage device becomes equal to or less than a predetermined voltage threshold. According to such a configuration, when the control device executes the first connection control on the first connection device, it is possible to suppress the flow of an overcurrent through the first load device and the first power storage device. Therefore, damage to the first load device and the first power storage device can be suppressed.

(Appendix 3)

The power supply system according to Appendix 1 or 2 may further include the backflow prevention device (28b) configured to restrict the supply of the electric power from the second power storage device to the second power supply circuit.

According to such a configuration, the control device can control the second power generation device to make the output voltage of the second power generation device lower than the output voltage of the second power storage device.

(Appendix 4)

The power supply system according to any one of Appendices 1 to 3 may further include the contactor device (22a) configured to disconnect the first power generation device from the first power supply circuit and the first connection circuit, and in a case where the supply of the electric power from the first power generation device to the first power supply circuit is cut off, the control device may execute the first connection control after disconnecting the first power supply circuit and the first connection circuit from the first power generation device using the contactor device. According to such a configuration, when a short circuit occurs between the first power generation device and the contactor device, the control device executes the first connection control on the first connection device, whereby it is possible to suppress the flow of an overcurrent through the second power generation device, the second load device, and the second power storage device. Therefore, damage to the second power generation device, the second load device, and the second power storage device can be suppressed.

(Appendix 5)

The power supply system according to any one of Appendices 1 to 4 may further include: the third power supply circuit (12c) configured to supply, to the third load device (16c), the DC power output from the first power generation device; the third power storage device (24c) connected to the third power supply circuit in parallel with the first power generation device; the fourth power supply circuit (12d) configured to supply, to the fourth load device (16d), the DC power output from the second power generation device; the fourth power storage device (24d) connected to the fourth power supply circuit in parallel with the second power generation device; the second connection circuit (18b) including the second connection device (20b) configured to connect the third power supply circuit and the fourth power supply circuit to each other; and the contactor device configured to disconnect the first power generation device from the first power supply circuit and the first connection circuit, wherein the control device is configured to execute, on the second connection device, the second connection control for connecting the third power supply circuit and the fourth power supply circuit to each other via the second connection circuit, and in a case where the supply of the electric power from the first power generation device to the first load device is stopped, the control device may disconnect the first power supply circuit and the first connection circuit from the first power generation device using the contactor device, and execute, on the first power generation device, the second voltage reduction control for approximating the output voltage of the first power generation device to the output voltage of the fourth power storage device, and thereafter execute the second connection control. According to such a configuration, when the control device executes the second connection control on the second connection device, it is possible to suppress the flow of an overcurrent through the second power generation device, the second load device, the second power storage device, the fourth load device, and the fourth power storage device. Therefore, damage to the second power generation device, the second load device, the second power storage device, the fourth load device, and the fourth power storage device can be suppressed.

(Appendix 6)

Provided is the moving object (44) including the power supply system according to any one of Appendices 1 to 5. According to such a configuration, when the control device executes the first connection control on the first connection device, it is possible to suppress the flow of an overcurrent through the first load device and the first power storage device. Therefore, damage to the first load device and the first power storage device can be suppressed. This in turn contributes to energy efficiency.

(Appendix 7)

Provided is the control method of the power supply system, the power supply system including: the first power supply circuit configured to supply, to the first load device, DC power output from the first power generation device; the first power storage device connected to the first power supply circuit in parallel with the first power generation device; the second power supply circuit configured to supply, to the second load device, DC power output from the second power generation device; the second power storage device connected to the second power supply circuit in parallel with the second power generation device; and the first connection circuit including the first connection device configured to connect the first power supply circuit and the second power supply circuit to each other, wherein, in a case where the electric power output from the second power generation device is supplied to the first load device, the first voltage reduction control for approximating the output voltage of the second power generation device to the output voltage of the first power storage device is executed on the second power generation device, and thereafter the first connection control for connecting the first power supply circuit and the second power supply circuit to each other via the first connection circuit is executed on the first connection device. According to such a configuration, when the first connection control is executed on the first connection device, it is possible to suppress the flow of an overcurrent through the first load device and the first power storage device. Therefore, damage to the first load device and the first power storage device can be suppressed. This in turn contributes to energy efficiency.

The present invention is not limited to the above disclosure, and various modifications are possible without departing from the essence and gist of the present invention.

The invention claimed is:

1. A power supply system comprising:

a first power supply circuit configured to supply, to a first load device, electric power output from a first power generation device, the electric power being direct current electric power;

a first power storage device connected to the first power supply circuit in parallel with the first power generation device;

a second power supply circuit configured to supply, to a second load device, electric power output from a second power generation device, the electric power being direct current electric power;

a second power storage device connected to the second power supply circuit in parallel with the second power generation device;

a first connection circuit including a first connection device configured to connect the first power supply circuit and the second power supply circuit to each other; and one or more processors that execute computer-executable instructions stored in a memory, wherein, in a case where the electric power output from the second power generation device is supplied to the first load device, the one or more processors execute the computer-executable instructions to cause the power supply system to execute, on the second power generation device, first voltage reduction control for approximating an output voltage of the second power generation device to an output voltage of the first power storage device, and thereafter execute, on the first connection device, first connection control for connecting the first power supply circuit and the second power supply circuit to each other via the first connection circuit.

2. The power supply system according to claim 1, wherein in the case where the electric power output from the second power generation device is supplied to the first load device, the one or more processors cause the power supply system to execute the first connection control after executing the first voltage reduction control on the second power generation device until a difference between the output voltage of the second power generation device and the output voltage of the first power storage device becomes equal to or less than a predetermined voltage threshold.

3. The power supply system according to claim 1, further comprising a backflow prevention device configured to restrict supply of electric power from the second power storage device to the second power supply circuit.

4. The power supply system according to claim 1, further comprising a contactor device configured to disconnect the first power generation device from the first power supply circuit and the first connection circuit, wherein in a case where supply of the electric power from the first power generation device to the first power supply circuit is cut off, the one or more processors cause the power supply system to execute the first connection control after disconnecting the first power supply circuit and the first connection circuit from the first power generation device using the contactor device.

5. The power supply system according to claim 1, further comprising:

a third power supply circuit configured to supply, to a third load device, the direct current electric power output from the first power generation device;

a third power storage device connected to the third power supply circuit in parallel with the first power generation device;

a fourth power supply circuit configured to supply, to a fourth load device, the direct current electric power output from the second power generation device;

a fourth power storage device connected to the fourth power supply circuit in parallel with the second power generation device;

a second connection circuit including a second connection device configured to connect the third power supply circuit and the fourth power supply circuit to each other; and a contactor device configured to disconnect the first power generation device from the first power supply circuit and the first connection circuit, wherein in a case where supply of the electric power from the first power generation device to the first load device is stopped, the one or more processors cause the power supply system to disconnect the first power supply circuit and the first connection circuit from the first power generation device using the contactor device, and execute, on the first power generation device, second voltage reduction control for approximating an output voltage of the first power generation device to an output voltage of the fourth power storage device, and thereafter execute, on the second connection device, second connection control for connecting the third power supply circuit and the fourth power supply circuit to each other via the second connection circuit.

6. A moving object comprising the power supply system according to claim 1.

7. A control method of a power supply system, the power supply system including:

a first power supply circuit configured to supply, to a first load device, electric power output from a first power generation device, the electric power being direct current electric power;

a first power storage device connected to the first power supply circuit in parallel with the first power generation device;

a second power supply circuit configured to supply, to a second load device, electric power output from a second power generation device, the electric power being direct current electric power;

a second power storage device connected to the second power supply circuit in parallel with the second power generation device; and a first connection circuit including a first connection device configured to connect the first power supply circuit and the second power supply circuit to each other, the control method comprising, in a case where the electric power output from the second power generation device is supplied to the first load device: executing, on the second power generation device, first voltage reduction control for approximating an output voltage of the second power generation device to an output voltage of the first power storage device; and thereafter executing, on the first connection device, first connection control for connecting the first power supply circuit and the second power supply circuit to each other via the first connection circuit.

* * * * *